United States Patent
Champion et al.

(10) Patent No.: US 12,192,434 B2
(45) Date of Patent: *Jan. 7, 2025

(54) CLOUD-BASED RENDERING OF INTERACTIVE AUGMENTED/VIRTUAL REALITY EXPERIENCES

(71) Applicant: zSpace, Inc., San Jose, CA (US)

(72) Inventors: Clifford S. Champion, San Jose, CA (US); Jonathan J. Hosenpud, San Francisco, CA (US); Baifang Lu, San Jose, CA (US); Alex Shorey, Brooklyn, WI (US); Robert D. Kalnins, San Jose, CA (US)

(73) Assignee: zSpace, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,999

(22) Filed: May 16, 2023

(65) Prior Publication Data
US 2023/0291882 A1   Sep. 14, 2023

Related U.S. Application Data

(63) Continuation of application No. 17/340,901, filed on Jun. 7, 2021, now Pat. No. 11,843,755.

(51) Int. Cl.
*H04N 13/111* (2018.01)
*G02B 27/00* (2006.01)
(Continued)

(52) U.S. Cl.
CPC ....... *H04N 13/111* (2018.05); *G02B 27/0093* (2013.01); *G06F 3/011* (2013.01);
(Continued)

(58) Field of Classification Search
CPC .. H04N 13/111; H04N 13/128; H04N 13/161; H04N 13/194; H04N 21/21805;
(Continued)

(56) References Cited

U.S. PATENT DOCUMENTS

| 8,935,611 | B2 | 1/2015 | Oberbrunner et al. |
| 10,734,116 | B2 | 8/2020 | Chen et al. |

(Continued)

FOREIGN PATENT DOCUMENTS

EP      2618582 A1      7/2013

OTHER PUBLICATIONS

Partial European Search Report in EP Application No. 22176721.3, dated Oct. 21, 2022, 15 pages.

(Continued)

*Primary Examiner* — Thai Q Tran
*Assistant Examiner* — Stephen R Smith
(74) *Attorney, Agent, or Firm* — Kowert, Hood, Munyon, Rankin & Goetzel, P.C.; Jeffrey C. Hood; Brian E. Moore

(57) ABSTRACT

Systems and methods for implementing methods for cloud-based rendering of interactive augmented reality (AR) and/or virtual reality (VR) experiences. A client device may initiate execution of a content application on a server and provide information associated with the content application to the server. The client device may initialize, while awaiting a notification from the server, local systems associated with the content application and, upon receipt of the notification, provide, to the server, information associated with the local systems. Further, the client device may receive, from the server, data associated with the content application and render an AR/VR scene based on the received data. The data may be based, at least in part, on the information associated with the local system. The providing and receiving may be performed periodically, e.g., at a rate to sustain a comfortable viewing environment of the AR/VR scene by a user of the client device.

20 Claims, 17 Drawing Sheets

(51) Int. Cl.
*G06F 3/01* (2006.01)
*H04N 13/128* (2018.01)
*H04N 13/161* (2018.01)
*H04N 13/194* (2018.01)

(52) U.S. Cl.
CPC ......... *H04N 13/128* (2018.05); *H04N 13/161* (2018.05); *H04N 13/194* (2018.05)

(58) Field of Classification Search
CPC ......... H04N 21/2402; H04N 21/25825; H04N 21/4312; H04N 21/440218; H04N 21/44218; H04N 21/6582; H04N 21/6587; H04N 21/816; G02B 27/0093; G06F 3/011; H04L 65/1016; H04L 65/1063; H04L 65/612; H04L 65/75; H04L 65/80; H04L 67/10; H04L 67/131
USPC ........................ 386/278; 348/43, 51; 709/206
See application file for complete search history.

(56) References Cited

U.S. PATENT DOCUMENTS

| | | | |
|---|---|---|---|
| 11,843,755 B2 | 12/2023 | Champion et al. | |
| 2003/0156188 A1* | 8/2003 | Abrams, Jr. | H04N 13/15 348/E13.058 |
| 2007/0183650 A1* | 8/2007 | Lipton | H04N 13/139 348/E13.02 |
| 2010/0194857 A1* | 8/2010 | Mentz | H04N 13/341 348/E13.001 |
| 2016/0219325 A1 | 7/2016 | Chu et al. | |
| 2017/0115488 A1* | 4/2017 | Ambrus | G02B 27/0172 |
| 2017/0178272 A1* | 6/2017 | Lashkari | G06T 1/20 |
| 2018/0205963 A1* | 7/2018 | Matei | H04N 21/85406 |
| 2019/0037011 A1* | 1/2019 | Kumar | H04L 45/121 |
| 2019/0362151 A1* | 11/2019 | Stokking | G06V 20/20 |
| 2021/0262800 A1* | 8/2021 | Levine | G02B 27/0172 |
| 2021/0297715 A1* | 9/2021 | Oz | H04N 21/2402 |
| 2021/0360196 A1* | 11/2021 | Oz | G06T 13/40 |
| 2022/0159261 A1* | 5/2022 | Oh | H04N 21/6379 |
| 2022/0191431 A1* | 6/2022 | Oz | H04N 7/147 |
| 2022/0277484 A1* | 9/2022 | Srivastava | G06T 7/75 |

OTHER PUBLICATIONS

Wang Wenmin et al., "Stereoscopic 3D Web: From idea to implementation", 2014 International Conference on Information Science, Electronics and Electrical Engineering, IEEE, vol. 3, Apr. 26, 2014 (Apr. 26, 2014), pp. 1440-1444, XP032672596, DOI: 10.1109/INFOSEEE.2014.6946158, ISBN: 978-1-4799-3196-5 [retrieved on Nov. 4, 2014] * p. 1443 p. 5; figure 5 table 3.

* cited by examiner

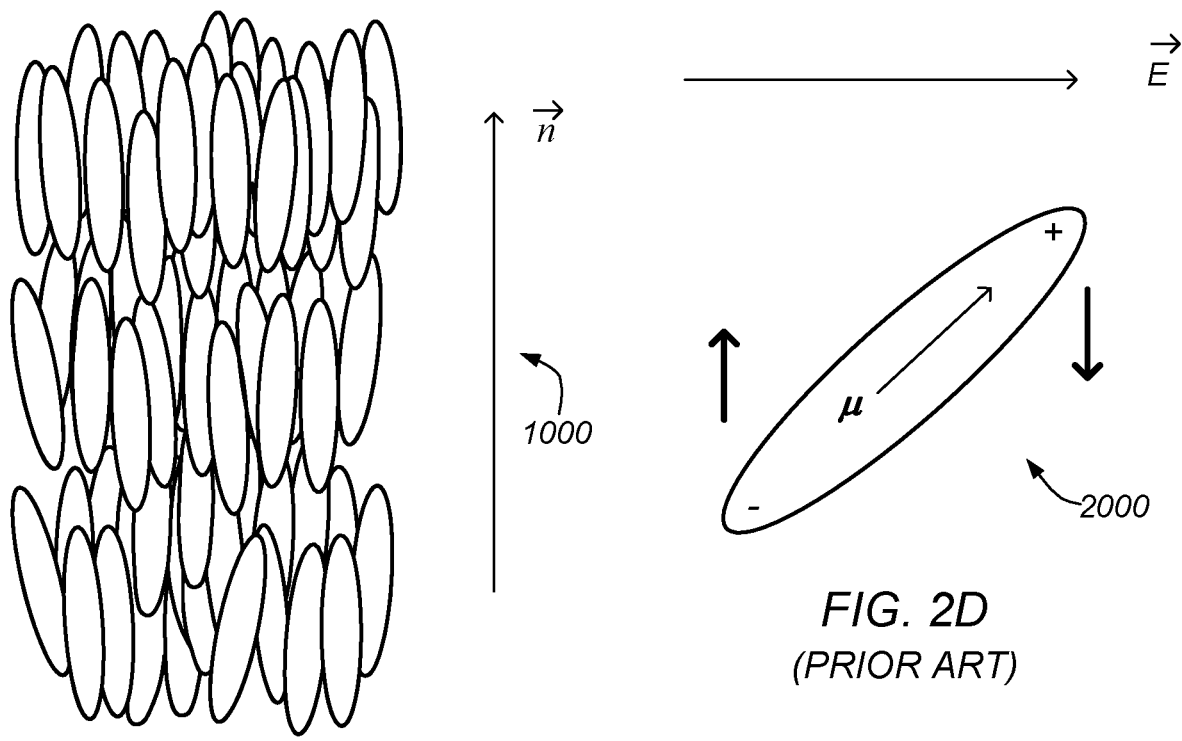
FIG. 2C
(PRIOR ART)
FIG. 2D
(PRIOR ART)
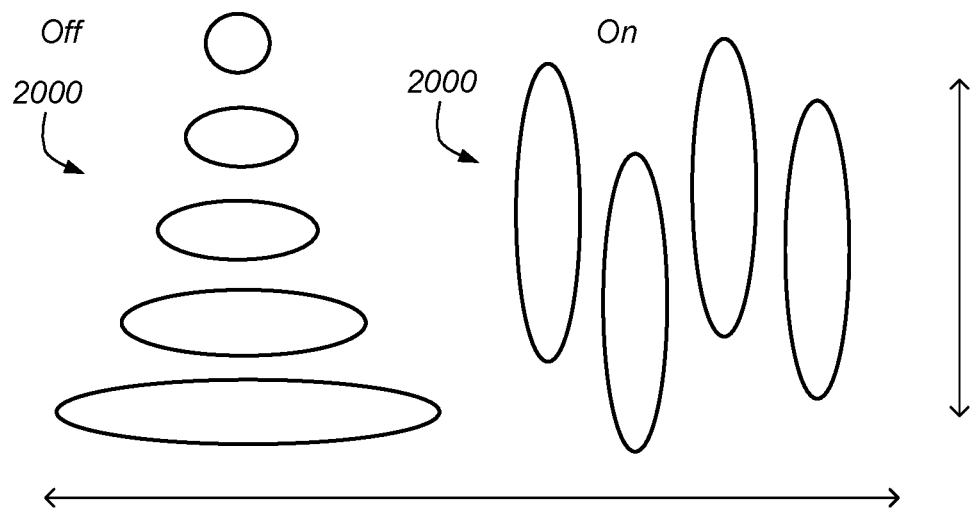
FIG. 2E
(PRIOR ART)

CLOUD-BASED RENDERING OF INTERACTIVE AUGMENTED/VIRTUAL REALITY EXPERIENCES

PRIORITY DATA

This application is a continuation of U.S. patent application Ser. No. 17/340,901, titled "Cloud-based Rendering of Interactive Augmented/Virtual Reality Experiences", filed Jun. 7, 2021, which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

This disclosure relates to the field of digital display and more particularly to methods for cloud-based rendering of interactive augmented reality (AR) and/or virtual reality (VR) experiences.

DESCRIPTION OF THE RELATED ART

Three-dimensional (3D) displays (actually, simulated 3D, e.g., via stereoscopic display (SD) techniques) are increasingly utilized for a variety of applications, including, for example, remote viewing, videoconferencing, video collaboration, and so forth.

FIG. 1 illustrates a modern display chain, according to typical prior art embodiments, which includes the following components:

1. GPU— Graphics Processing Unit. This component resides on a personal computer, workstation, or functional equivalent, and outputs video levels for each color or channel of a supported color model, e.g., for each of three colors, typically Red (R), Green (G), and Blue (B), for each pixel on the display. Each of these numbers is typically an 8-bit number, with a range of 0 to 255, although other ranges are possible.
2. Scaler—This component takes as input the video levels (e.g., for R, G, and B) for each pixel output from the GPU, and processes them in various ways, before outputting (usually) modified video levels for RGB, usually in the same 8-bit range of 0-255. This component may also scale an image from the input resolution to a different, rendered resolution supported by the display.
3. Panel—This component is the display itself, typically a liquid crystal display (LCD), though other displays are possible, and takes as input the video levels (e.g., for R, G and B) output from the scaler for each pixel, and converts the video levels to voltages, which are then delivered to each pixel on the display. The panel itself may modify the video levels before converting them to voltages.

The video chain generally modifies the video levels in two ways, specifically gamma correction and overdrive. Note that the functionality described above is typically implemented in the scaler, but is sometimes implemented at least partially in other devices or elements of the video chain, e.g., in the GPU or display device (panel).

Time Sequential Stereo Displays

Unlike a normal (i.e., monoscopic) display, in a stereo display, there are two images for each video frame: right and left. The right image must be delivered to only an observer's right eye, and the left image must be delivered to only the observer's left eye. In a time sequential stereo display, this separation of right and left images is performed in time, i.e., the left and right images are presented sequentially, and thus, contains some time-dependent element which separates these two images. There are two common architectures for stereo displays.

The first architecture uses a device called a polarization switch (PS), which may be a distinct (i.e., separate) or integrated LC device or other technology switch and which is placed in front of the LCD panel (or any other type of imaging panel, such as an OLED (organic light emitting diode) panel, a plasma display, etc.) or any other pixelated panel display used in a time-sequential stereo imaging system. Specifically, the PS switch may be placed between the display panel and the viewer, as shown in FIG. 2A. The purpose of the PS is to switch the light transmitted from the display panel between two orthogonal polarization states. For example, one of these states may be horizontally linearly polarized light (i.e., the light may be in a horizontal linear polarization state), and the other may be vertically linearly polarized light (i.e., the light may be in a vertical linear polarization state); however, other options are possible (e.g., left and right circular polarization states, etc.). The key feature that allows the PS to deliver the correct image to the correct eye of the viewer (i.e., the left image to the left eye and the right image to the right eye) is that the two polarization states are orthogonal to each other.

This architecture allows achievement of the stereo effect shown in prior art FIG. 2B. As may be seen, the top portion of the figure shows the (display) panel switching between a left image and a right image. Synchronous with the panel switching, the PS is switching the light being transmitted between a left state and a right state, as shown. These two states emit two corresponding orthogonal polarization states, as explained above. As FIG. 2B further shows, the system includes stereoscopic eyewear that is designed such that the left lens will only pass the left state polarization and the right lens will only pass the right state polarization. In this way, separation of the right and left images is achieved.

The second conventional architecture uses stereoscopic shutter glasses, which replace (or integrate the functionality of) the PS and eyewear. In such systems, each eye is covered by an optical shutter, which can be either open or closed. Each of these shutters is cycled between opened and closed synchronously with the display panel in such a way that when the left image is shown on the display, only the left eye shutter is open, and when the right image is shown on the display, only the right eye shutter is open. In this manner, the left and right views are alternatingly presented to the user's left and right eye, respectively. The alternate presentation of left and right views to the user's left and right eyes creates the perception of visual depth. Virtual objects may be displayed in this created 3D space, which exists both above the 3D stereoscopic display panel (i.e., negative space) and below the stereoscopic display panel (i.e., positive space).

Liquid Crystal Displays (LCDs)

Some of the advantages of a liquid crystal display (LCD) include lighter weight, lower power consumption, and less radiation contamination. LCD monitors have been widely applied to various portable information products (e.g., user equipment devices such as laptops, tablets, mobile phones, PDAs, and so forth). Typically, in an LCD monitor, incident light produces different polarization or refraction effects when the alignment of liquid crystal molecules is altered. The liquid crystal molecules affect the transmission of the incident light, and thus a magnitude of the light emitted from the liquid crystal molecules varies. The LCD monitor utilizes the characteristics of the liquid crystal molecules to control the corresponding light transmittance and produces images per different magnitudes of red, blue, and green light.

A schematic image of a nematic liquid crystalline phase 1000 is shown in FIG. 2C. The liquid crystal materials have no positional long-range ordering of their molecules' centers of mass, as in crystals. However, the liquid crystal materials possess long-range orientational ordering of their molecules along a main axis direction (in the simplest case of so-called nematic liquid crystal), effectively allowing the molecules to be aligned along one preferred direction, called the director of the liquid crystal, $\vec{n}$ (see FIG. 2C).

Liquid crystal molecules either possess a permanent dipole moment, or acquire the induced dipole moment when placed in an electric field. In both cases, in the electric field a liquid crystal molecule 2000 is characterized by some dipole moment, $\mu$. This dipole may be aligned along the molecule's symmetry axis (such materials are said to have the positive dielectric anisotropy) or perpendicular to it (the negative dielectric anisotropy). The separation of charge in a molecule leads to its rotation in the electric field until it is aligned parallel or perpendicular to the applied field, depending on a sign of the material's dielectric anisotropy. FIG. 2D depicts such re-orientation of a liquid crystal molecule with the positive dielectric anisotropy.

As all of the molecules in the liquid crystalline phase are subject to the re-orientation under the effect of the electric field at the same time, it is possible to control the symmetry axis of the phase (the director) and usually the optical axis of the liquid crystalline sample.

FIG. 2E illustrates the configuration of liquid crystal molecules within a conventional twisted nematic liquid crystal-based polarization rotator. The nematic liquid crystal is chosen to have a positive dielectric anisotropy. The left-hand side of the figure illustrates the voltage OFF, 90-degree rotation state. The right-hand side of the figure illustrates the voltage ON, 0-degree rotation state.

Depending on the type of the liquid crystal cell and the relative orientations of the liquid crystal cell's optical axis and the polarizers' transmission axis, the polarization rotator can operate in either Normal White (NW) or Normal Black (NB) mode. These modes are governed by the optical transmission in the zero or low-voltage state, i.e., the Normal White mode corresponds to the maximum optical transmission in the zero or low-voltage state, and the minimum transmission in the high-voltage state; it is the opposite for the Normal Black mode.

The twisted nematic polarization rotator usually operates in the Normal White mode. In this case the higher applied voltage improves the contrast ratio of the Normal White mode due to the decrease of the residual retardation of a liquid crystal cell.

Other type of polarization rotators such as electrically controlled birefringence (ECB) mode can operate both in Normal White and Normal Black modes. Using additional optical elements in the 3D system (such as two orthogonal polarizers), the same polarization rotator can operate in both modes alternately in each frame.

SUMMARY

Various embodiments of systems for implementing methods for cloud-based rendering of interactive augmented reality (AR) and/or virtual reality (VR) experiences. Embodiments described herein may include methods performed by a client device as well as methods performed by a server. In various embodiments, the client device and server may communicate over a network via one or more network protocols, such as Third Generation Partnership Project (3GPP) Fifth Generation (5G) New Radio (NR), 3GPP Long Term Evolution (LTE), as well as Institute of Electrical and Electronics Engineers (IEEE) 802.11 (e.g., Wi-Fi).

In some embodiments, a client device may be configured to initiate execution of a content application on a server, including providing information associated with the content application to the server via a network. Additionally, the client device may be configured to initialize, while awaiting a notification from the server, local systems associated with the content application and, upon receipt of the notification, provide, to the server via the network, information associated with the local systems. Further, the client device may be configured to receive, from the server via the network, data associated with the content application and render an AR/VR scene based on the received data. The data may be based, at least in part, on the information associated with the local system. Note that the providing and receiving may be performed periodically, e.g., at a rate to sustain a comfortable viewing environment of the AR/VR scene by a user of the client device.

In some embodiments, a server may be configured to receive, from a client device via a network, a request to initiate execution of a content application. The content application may be executable to render an AR/VR scene based on information provided by the client device. Additionally, the server may be configured to receive, from the client device, information associated with local systems of the client device. The server may provide the information associated with the local systems of the client device to the content application to render the AR/VR scene. Further, the server may transmit, to the client device via the network, data associated with the content application, e.g., data associated with the rendered AR/VR scene.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present disclosure can be obtained when the following detailed description of the preferred embodiment is considered in conjunction with the following drawings, in which:

FIG. 2C illustrates an example of a schematic diagram of a nematic liquid crystalline phase, according to implementations.

FIG. 2D illustrates an example of a schematic diagram of a switching of a liquid crystal molecule in an electric field, according to implementations.

FIG. 2E illustrates an example of a schematic diagram of a configuration of liquid crystal molecules within a conventional twisted nematic liquid crystal-based polarization rotator, according to implementations.

Figure 1:
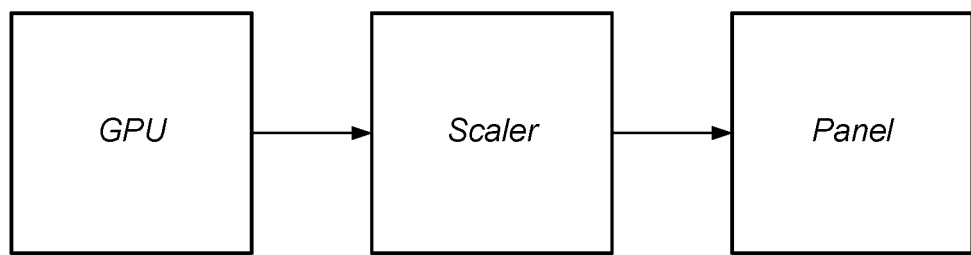
FIG. 1 illustrates a modern display chain, according to implementations.
Figure 2A:
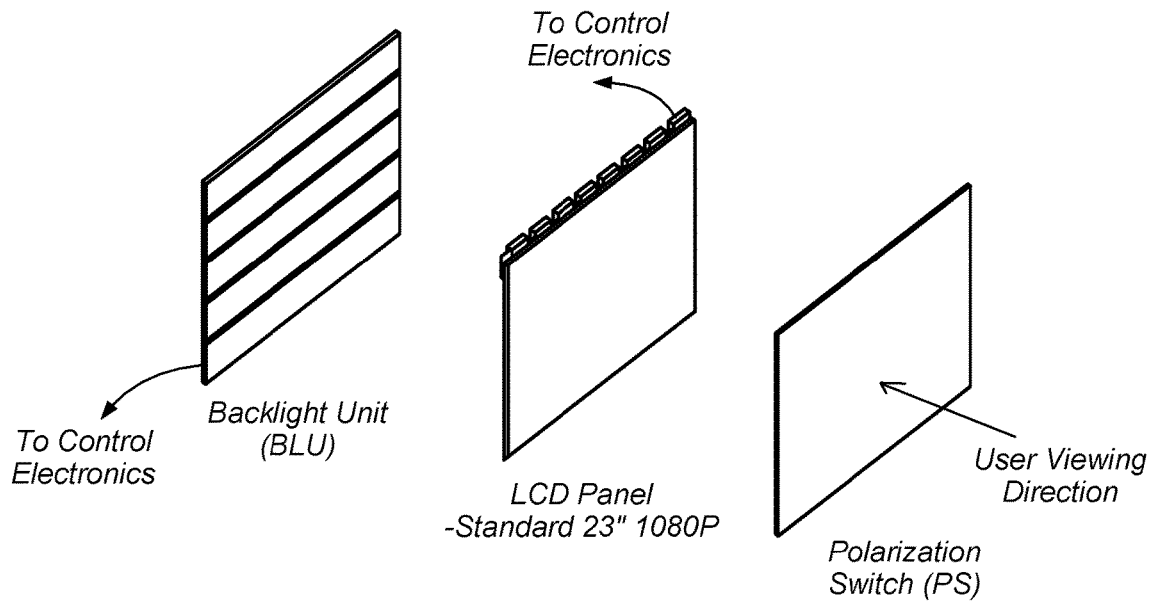
FIG. 2A illustrates an example of an architecture that utilizes a polarization switch, according to implementations.
Figure 2B:
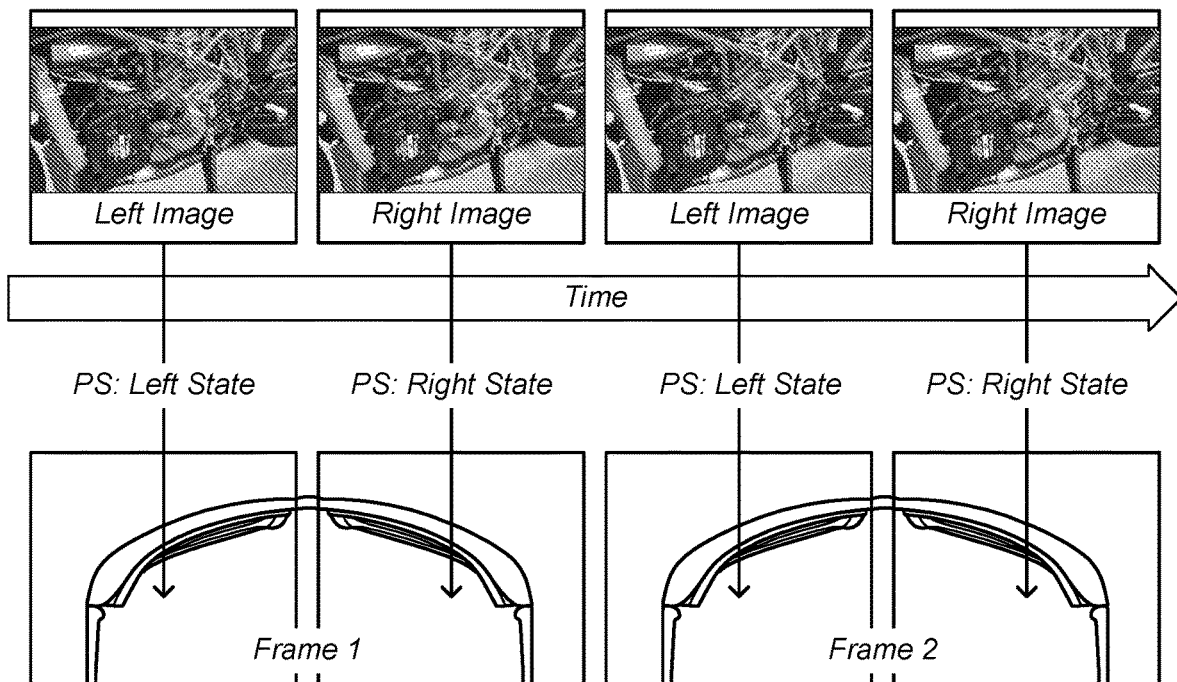
FIG. 2B illustrates an example of a stereo effect (simulated 3D) using polarization switching between left and right views, according to implementations.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

Memory Medium—any of various types of memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, tablet, or other device or combinations of devices. In general, the term "computer system" can be broadly defined to encompass any device (or combination of devices) having at least one processor that executes instructions from a memory medium.

Graphical Processing Unit—refers to a component that may reside on a personal computer, workstation, server, graphics server, or equivalent, and outputs video levels for each color or channel of a supported color model, e.g., for each of three colors, typically Red (R), Green (G), and Blue (B), for each pixel on the display. Each of these numbers is typically an 8-bit number, with a range of 0 to 255, although other ranges are possible.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN— The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element (or Functional Unit)—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Coupled Zone—refers to a physical volume in which the user of a 3D stereoscopic display can view 3D content within the human eye's natural depth of field. For example, when a person sees an object in the physical world, the person's eyes converge on, or look (individually aim) at, the object. Additionally, as the two eyes converge on the object, each eye's lens also focuses, via accommodation, (monoscopically) on the object. In this sense, both eyes focus and converge on the object, thus focus and convergence are "coupled."

Disparity—refers to the difference between the left eye and right eye images of a 3D stereoscopic display. Disparity may be described in at least two ways. First, with respect to the display device, i.e., the 3D stereoscopic display, disparity may be described by the number of pixels of separation between corresponding positions of the image, or content, being displayed, or rendered. In other words, the pixels of separation between the left eye and right eye images, or content. Alternatively, or in addition to, with respect to the point of view of the user, disparity may be described by the degree of angular separation between corresponding positions in the images, or content, being displayed, or rendered, i.e., the angular separation between the left eye and right eye images, or content.

Projection—refers to the display of a 3D object, or content, on a two-dimensional (2D) display. Thus, a projection may be described as the mathematical function applied to objects within a virtual 3D scene to determine the virtual position of the objects within a 3D space that may be defined by the size of the 3D stereoscopic display and the point of view of a user.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene. A viewpoint is synonymous with "point of view" (POV). (See definition of POV below.)

Eyepoint—the physical location (and/or orientation) of a single eye or a pair of eyes. A viewpoint above may correspond to the eyepoint of a person. For example, a person's eyepoint has a corresponding viewpoint.

Point of View (POV)— refers to or specifies a position and orientation. For example, a POV may be a viewpoint or eyepoint, generally of a user, but may also be a viewpoint of an optical device, such as a camera. The POV is generally a means to capture a relationship between two or more 6 degree of freedom objects. In a typical application of the present techniques, a user's pair of eyes or head (view) is positioned in any X, Y, Z position and/or pitch, yaw, roll orientation to a display device, e.g., a monitor screen, which may have its own position in any X, Y, Z position and/or pitch, yaw, roll orientation. In this example, the POV can be defined as the position/orientation of the user's view with respect to the positioning/orientation of the display device. The POV determination may be identified by a capture system. In a typical application of the present techniques, one or more tracking devices are attached to the display device, such that the controller knows what the tracking system tracks in the context of the display device, meaning the tracking system, being attached to the display device, is programmatically aware of the position/orientation of the display device, as well as any potential change to the position/orientation of the display device.

The tracking system (which may identify and track, among other things, the user's view) may identify the position/orientation of the user's view, and this information may then be correlated to the tracking system's identification of the viewing device's position/orientation (again, with respect to the display device).

Vertical Perspective—a perspective effect rendered from a viewpoint which is substantially perpendicular to the display surface. "Substantially perpendicular" refers to 90 degrees or variations thereof, such as 89 or 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective effect rendered from a viewpoint which is not perpendicular to the display surface. More particularly, the term "horizontal perspective" may typically refer to a perspective effect which is rendered using a substantially 45-degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Another conception of the horizontal perspective as commonly used in embodiments of the present techniques relates to the projection of the intended rendered graphics to the viewing device. With the POV determined, a horizontal perspective engine may identify the correct graphics frustum in the 3D space, taking into account the position and orientation of the viewing device as defining the render plane of the frustum and the user's view in position and orientation to define a camera point of the frustum in relation to the render plane. The resultant projection is then rendered onto the viewing device as will be seen by the user.

Position—the location or coordinates of an object (either virtual or real). For example, position may include x, y, and z (i.e., location) coordinates within a defined space. The position may be relative or absolute, as desired. Position may also include yaw, pitch, and roll information, e.g., when defining the orientation of a viewpoint. In other words, position is defined broadly so as to encompass information regarding both location and orientation.

Passive Stylus—a peripheral device or element such as a handheld device, handheld pen device, handheld pointing device, hand, finger, glove, or any object used to directly interact with rendered virtual objects as in a stereo rendered virtual projected objects.

Active Stylus—a peripheral device or element that provides additional capabilities to improve accuracy and precision in the determination of a position of the active stylus. These capabilities may include one or more of accelerometers, magnetometers, gyroscopes, global positioning system, compass, and/or gravity sensor. Examples include a handheld device, handheld pen device, handheld pointing device, and/or any object that includes such capabilities and is used to directly interact with rendered virtual objects as in a stereo rendered virtual projected objects.

Similar—as used herein in reference to geometrical shapes, refers to the geometrical term indicating that objects have the same shape, or that one object has the same shape as the mirror image of the other object. In other words, objects are considered similar if one object may be obtained from the other by uniformly scaling (enlarging or shrinking) the object. Additionally, the term similar, or similar objects, means that either object may be rescaled, repositioned, and reflected, so as to coincide with the other object. Thus, for example, if a first object is geometrically similar to a second object, i.e., has the same shape but possibly a different size, then either object may be uniformly scaled to obtain the geometrical size and shape of the other object. Thus, the first object may be uniformly scaled to obtain the second object or the second object may be uniformly scaled to obtain the first object. Note that this definition of similar only refers to the use of the word in the context of geometrical shapes and retains it ordinary meaning in other contexts (e.g., system A is similar to system B implies that system A resembles system B without being identical to system B).

Approximately—refers to a value that is correct or exact within some specified tolerance. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Proximate—near to; for example, proximate may mean within some specified distance, or within some specified fraction of a distance. Note that the actual threshold for being proximate is generally application dependent. Thus, in various applications, proximate may mean being within 1 mm, 1 inch, 1 foot, 1 meter, 1 mile, etc. of some reference point or object, or may refer to being within 1%, 2%, 5%, 10%, etc., of a reference distance from some reference point or object.

Substantially—refers to a term of approximation. Similar to the term "approximately," substantially is meant to refer to some tolerable range. Thus, if part A is substantially horizontal, then part A may be horizontal (90 degrees from vertical), or may be within some tolerable limit of horizontal. For example, in one application, a range of 89-91 degrees from vertical may be tolerable, whereas, in another application, a range of 85-95 degrees from vertical may be tolerable. Further, it may be that the tolerable limit is one-sided. Thus, using the example of "part A is substantially horizontal," it may be tolerable for Part A to be in a range of 60-90 degrees from vertical, but not greater than 90 degrees from vertical. Alternatively, it may be tolerable for Part A to be in a range of 90-120 degrees from vertical but not less than 90 degrees from vertical. Thus, the tolerable limit, and therefore, the approximation referenced by use of the term substantially may be as desired or as required by the particular application.

Equivalent—refers to an object that is equal to or corresponds with another object in value, measure, function, meaning, effect, significance, appearance, and so forth. For example, a first image may be equivalent to a second image if imagery within the first image corresponds to imagery within the second image. Additionally, a first image may be substantially equivalent to a second image if imagery within the first image at least partially corresponds to imagery with the second image, e.g., within some tolerable range and/or limit.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended, and means "including."". As used in the appended claims, this term does not foreclose additional elements, structure, or steps. Consider a claim that recites: "A system comprising a display . . . "; such a claim does not foreclose the system from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

This specification may include references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

FIGS. 3-6 Exemplary Systems

Figure 3A:
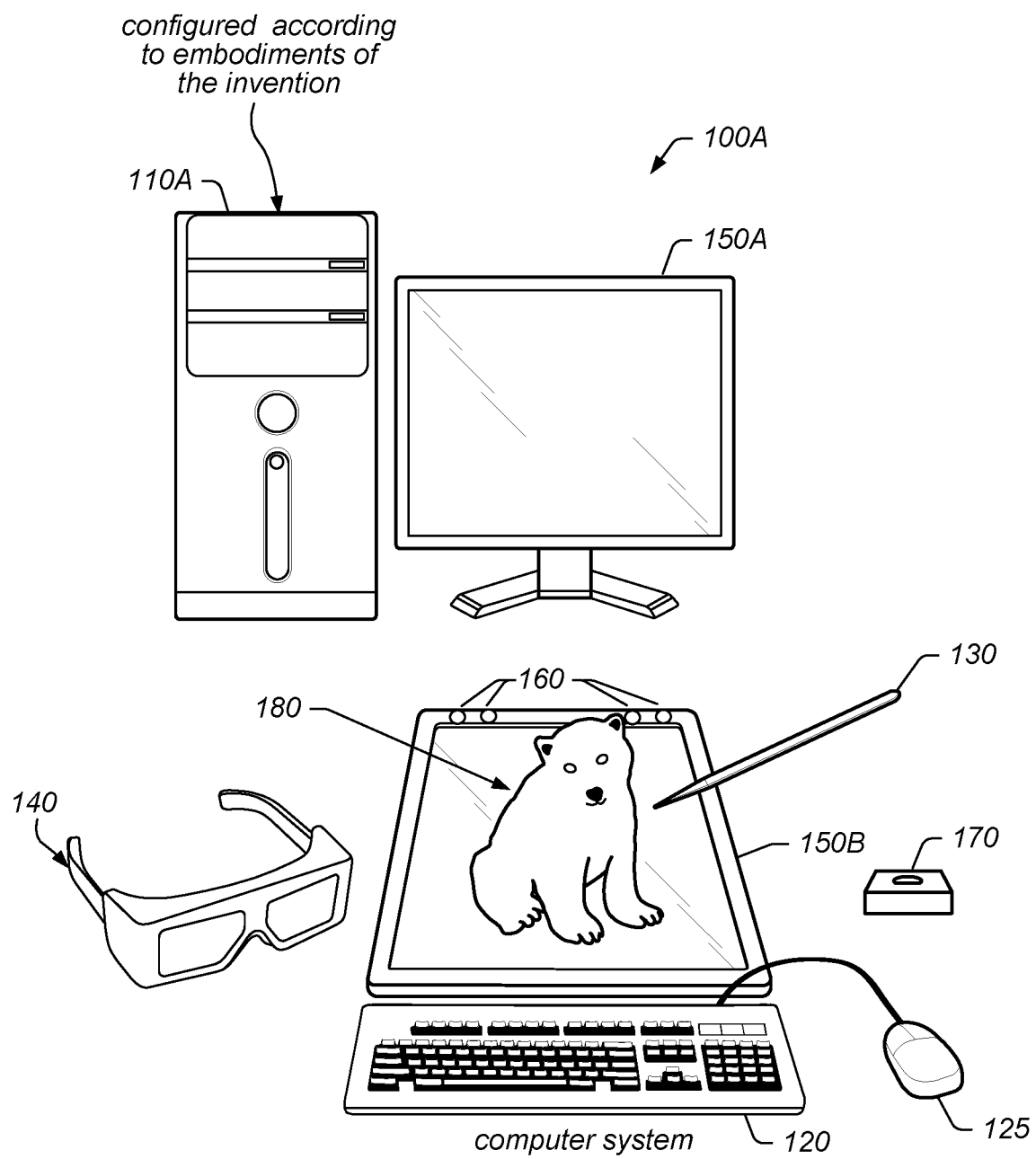
FIGS. 3A and 3B illustrate examples of 3D stereoscopic display systems configured according to some embodiments.
Figure 3B:
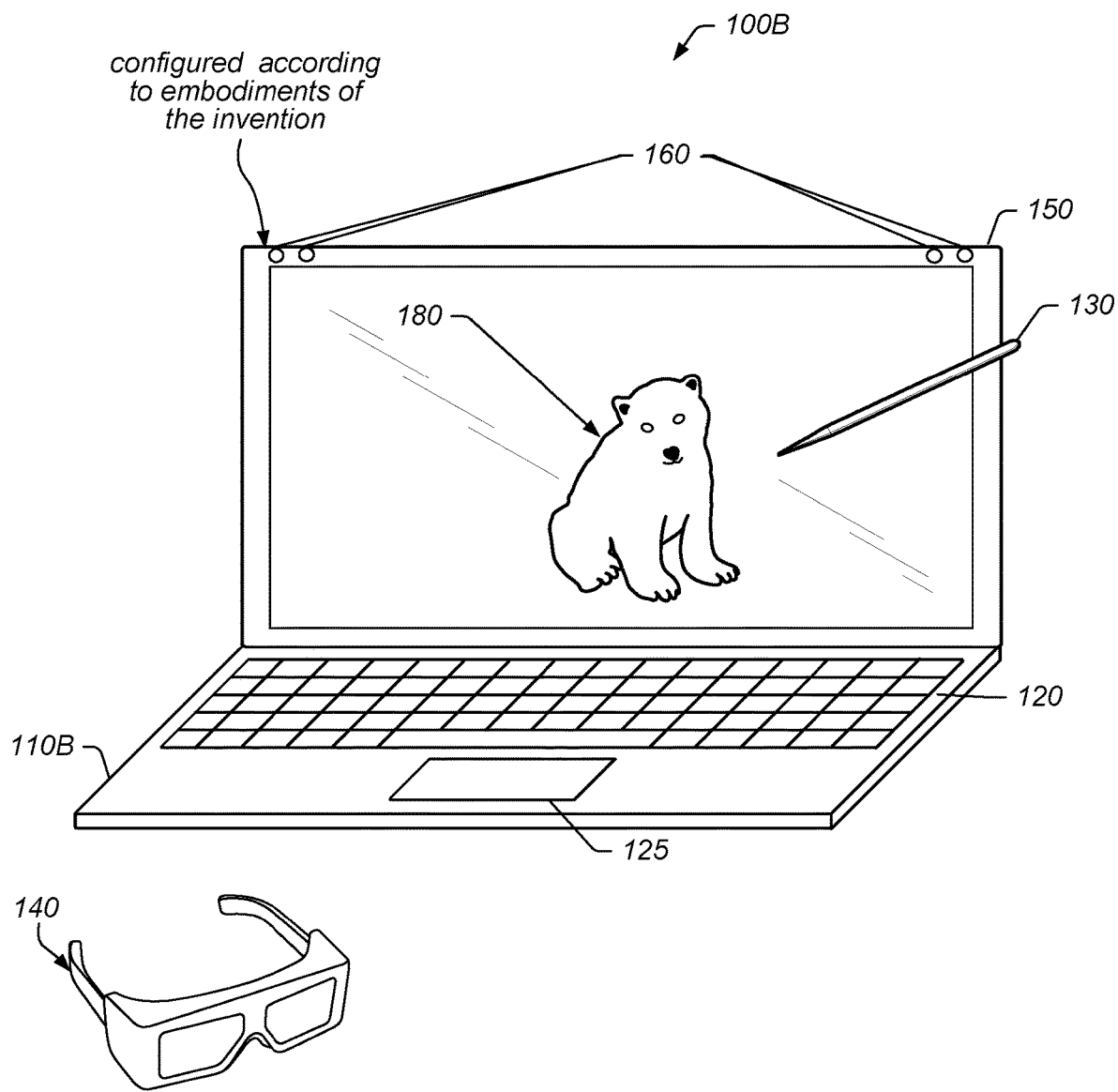

FIGS. 3A and 3B illustrate exemplary systems configured to implement various embodiments of the techniques described below.

In the exemplary embodiment of FIG. 3A, computer system 100A may include chassis 110A, display 150A and display 150B (which may collectively be referred to as display 150 or "one or more displays" 150), keyboard 120, mouse 125, user input device 130, eyewear 140, at least two cameras 160, and caddy 170. Note that in some embodiments, two displays 150A and 150B may not be used; instead, for example, a single display 150 may be used. In various embodiments, at least one of the displays 150A and 150B may be a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110A may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments, the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. For example, the computer system may include a tracking system that may track one or more of a user's head, a user's hand, or the stylus. Additionally, the memory medium may store operating system software, as well as other software for operation of the computer system. Various embodiments further include receiving or storing instructions and/or data implemented in accordance with the foregoing description upon a carrier medium.

As indicated above, the computer system 100A may be configured to display a three-dimensional (3D) scene (e.g., via stereoscopic images), or 3D content, such as scene 180, using the display 150A and/or the display 150B. The computer system 100A may also be configured to display a "view" of the 3D scene using the display 150A, the display 150B, and/or another display, as described in more detail below. The "view" of the 3D scene, or content, may refer to a displayed portion of the 3D scene from a viewpoint within the 3D scene. A viewpoint within the 3D scene may be referred to as a "virtual viewpoint." The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

It should be noted that the embodiment of FIG. 3A is exemplary only, and other numbers of displays are also envisioned. For example, the computer system 100A may include only a single display or more than two displays, or the displays may be arranged in different manners than shown, e.g., as goggles or other wearable eyewear or headgear as further described below in reference to FIG. 5. In this particular embodiment, the display 150A is configured as a vertical display (which may be perpendicular or approximately perpendicular to a user's line of sight) and the display 150B is configured as a horizontal display (which may be parallel (or approximately parallel) or oblique to a user's line of sight). The vertical display 150A may be used (e.g., via instructions sent by a graphics engine executing in the chassis 110A) to provide images which are presented according to a vertical (or central) perspective and the display 150B may be used (e.g., via instructions sent by a graphics engine executing in the chassis 110A) to provide images that are presented according to a horizontal perspective. Descriptions of horizontal and vertical perspectives are provided herein (see, e.g., the above Terms section). Additionally, while the displays 150 are shown as flat panel displays, in other embodiments, they may be any type of device or system which is capable of displaying images, e.g., projection systems. For example, display(s) 150 may be or include a CRT (cathode ray tube) monitor, an LCD (liquid crystal display) monitor, or a front projection or a back projection screen or surface with a plurality of projectors, among others. Display(s) 150 may include a light emitting diode (LED) backlight or other type of backlight.

Either or both of the displays 150A and 150B may present (display) stereoscopic images for viewing by the user. By presenting stereoscopic images, the display(s) 150 may present a 3D scene for the user. This 3D scene may be considered or referred to as an illusion or simulated 3D because the actual provided images are 2D, but the scene is conveyed in 3D via the user's interpretation of the provided images via stereoscopic effects. In order to properly view the stereoscopic images (one for each eye for each image frame), the user may wear eyewear 140. Eyewear 140 may be any of anaglyph glasses, polarized glasses, shutter glasses, lenticular glasses, etc., among others. In some embodiments, the display(s) 150 may be included (or incorporated) in the eyewear (or other wearable headgear). In embodiments using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens of the eyewear has the corresponding orthogonal polarization for receiving the corresponding image. With shutter glasses, each lens is synchronized with respect to left and right eye images provided by the display(s) 150, e.g., in alternating fashion. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two-dimensional array of lens elements. The stereoscopic image may be provided via optical methods, where left and right eye images are provided only to the corresponding eyes using optical means such as prisms, mirror(s), lens(es), and the like. Large convex or concave lenses can also be used to receive two separately projected images to the user.

In one embodiment, eyewear 140 may be used as a position input device to track the user view (e.g., eyepoint or point of view (POV)) of a user viewing a 3D scene presented by the system 100A. For example, eyewear 140 may provide information (e.g., position information, which includes orientation information, etc.) that is usable to determine the position of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position data suitable for the head tracking. The input device(s), such as a stylus, keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position of the display(s) 150 and the point of view of the user may be used to map a portion of the virtual space to the physical space of the system 100A. In essence, the physical space and components used may be mapped to the virtual model in order to accurately render a 3D scene of the virtual space.

One or more of the user input devices (e.g., the keyboard 120, the mouse 125, the user input device 130, pointing device, user control device, user hand/fingers, etc.) may be used to interact with the presented 3D scene. For example, the user input device 130 (shown as a passive stylus) or simply the user's hands may be used to directly interact with virtual objects of the 3D scene (via the viewed projected objects). Such direct interaction may be possible with negative space portions of the 3D scene. In some embodiments, at least a portion of the 3D scene may be presented in this negative space, which is in front of or otherwise outside of the at least one display, via stereoscopic rendering (of the 3D scene). In some embodiments, at least a portion of the 3D scene may appear as a hologram-like image above the surface of the display 150. For example, when the horizontal display 150B is used, the 3D scene may be seen as hovering above the horizontal display. It should be noted, however, that a portion of the 3D scene may also be presented as appearing behind the display surface, which is in positive space Thus, negative space refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, negative space may be considered to be a "hands-on volume" as opposed to an "inner-volume" (i.e., positive space), which may be under the surface of the display(s), and thus not accessible. Thus, the user may interact with virtual objects in the negative space because they are proximate to the user's own physical space. Said another way, the positive space is located behind (or under) the viewing surface, and so presented objects appear to be located inside (or on the back side of) the physical viewing device. Thus, objects of the 3D scene presented within the positive space do not share the same physical space with the user and the objects therefore cannot be directly and physically manipulated by hands or physically intersected by hand-held tools such as user input device 130. Rather, they may be manipulated indirectly, e.g., via a computer mouse, a joystick, virtual representations of hands, handheld tools, or a stylus, or by projections from the stylus (e.g., a virtual laser or a virtual plane).

In some embodiments, system 100A may include one or more sensors 160. The one or more sensors 160 may be included in a tracking system. FIG. 3 illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, fewer than four sensors may be used (e.g., two sensors), wherein each sensor may track both the user (e.g., the user's head and/or the user's point of view) and the user input device. Sensors 160 may be used to image a user of system 100A, track a user's movement, or track a user's head or eyes, among other contemplated functions. In one embodiment, cameras 160 may track a position and/or an orientation of user input device 130. The information regarding the position (including the orientation) of the user input device 130 provided by the one or more sensors 160 may be used to perform 3D tracking of the user input device 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. System 100A may also include a caddy 170 to store user input device 130. Caddy 170 may also be used to calibrate the orientation of the stylus to a known roll, pitch, and yaw, and so may be in a fixed position relative to cameras 160.

In one embodiment, the system 100A may be configured to couple to a network, such as a wide area network, via an input. The input may be configured to receive data (e.g., image data, video data, audio data, etc.) over the network from a system similar to system 100A. In other embodiments, a tracking system may include cameras 160. Cameras 160 may be configured to provide visual information regarding a user (e.g., such that a POV, e.g., the position (including the orientation), of the user may be determined or such that a position of the user's hand may be determined). However, it should be noted that any type of various tracking techniques or devices may be used as desired. Note that as used herein, POV of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three location coordinates and three orientation coordinates, although any POV may be used as desired, e.g., three location coordinates and two or three orientation coordinates, and so forth. As noted above, position coordinates may include both location and orientation coordinates.

Note that in some embodiments, the tracking system may rely at least in part on the components of chassis 110A to determine a position or a POV, e.g., via execution of one or more programs by or on a processor or functional unit of chassis 110A, although in other embodiments the tracking system may operate independently, e.g., may have its own processor or functional unit.

In certain embodiments, the system may include components implementing a perspective-based image capture system, for capturing images of a target object at a location remote from the system. For example, the perspective-based image capture system may include an input configured to couple to a network for receiving information regarding a point of view (POV) from a tracking system at a remote location. The information regarding the POV may indicate a position of a remote user. The perspective-based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired.

A 3D scene generator (e.g., content processing system) stored and executed in the chassis 110A may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit, procedure, and/or fiducial markers to ensure proper mapping of the peripheral device to the display images and proper mapping between the projected images and the virtual images stored in the memory of the chassis 110A.

Thus, the system 100A may present a 3D scene with which the user may interact in real time. The system may include real-time electronic display(s) 150 that may present or convey perspective images in the open space, and user input device 130 that may allow the user to interact with the 3D scene with hand controlled or hand-held tools. The system 100A may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

Further, while the system 100A is shown as including horizontal display 150B because it simulates the user's visual experience with the horizontal ground, other viewing surfaces may offer similar 3D illusion experiences. For example, the 3D scene may appear to be hanging from a ceiling by projecting the horizontal perspective images onto a ceiling surface, or may appear to be floating from a wall by projecting horizontal perspective images onto a vertical wall surface. More generally, any other variations in display orientation and perspective (or any other configuration of the system 100A) may be used as desired.

According to various embodiments of the present disclosure, the display 150 may display various types of information (for example, multimedia data or text data) to be provided to the user. The display 150 may be configured to include a liquid crystal display (LCD), a light emitting diode (LED) display, an organic LED (OLED) display, a plasma cell display, an electronic ink array display, an electronic paper display, a flexible LCD, a flexible electrochromic display, or a flexible electro wetting display. The display 150 may be connected functionally to an element(s) of the electronic device. Also, the display 150 may be connected functionally to an electronic device(s) other than the electronic device.

In the exemplary embodiment of FIG. 3B, computer system 100B may include chassis 110B which may include display 150, keyboard 120, trackpad or touchpad 135, and at least two cameras 160. The computer system 100B may also include user input device 130 and eyewear 140. Note that in some embodiments, computer system 100B may be wireless or mobile station, e.g., such as a wireless station 106 further described below. For example, computer system 100B may be or included on mobile telephones or smart phones (e.g., iPhone™, Android™-based phones), tablet computers (e.g., iPad™, Samsung Galaxy™, etc.), laptop computers (e.g., MacBook™), portable gaming devices (e.g., Nintendo DS™, PlayStation Portable™, Gameboy Advance™, iPhone™), portable Internet devices, and/or other handheld devices. In various embodiments, at least one of the display 150 may be a stereoscopic display. It is noted that a stereoscopic display may also be configured to display two-dimensional (2D) objects and may be configured to operate in a 2D mode.

The chassis 110B may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments, the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. For example, the computer system may include a tracking system that may track one or more of a user's head, a user's hand, or the stylus. Additionally, the memory medium may store operating system software, as well as other software for operation of the computer system. Various embodiments further include receiving or storing instructions and/or data implemented in accordance with the foregoing description upon a carrier medium.

As indicated above, the computer system 100B (or more specifically, chassis 110B) may be configured to display a three-dimensional (3D) scene (e.g., via stereoscopic images), or 3D content, such as scene 180, using the display 150. The computer system 100B may also be configured to display a "view" of the 3D scene using the display 150. The "view" of the 3D scene, or content, may refer to a displayed portion of the 3D scene from a viewpoint within the 3D scene. A viewpoint within the 3D scene may be referred to as a "virtual viewpoint." The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

In some embodiments, the display 150 may present a 3D scene for the user. This 3D scene may be considered or referred to as an illusion or simulated 3D because the actual provided images are 2D, but the scene is conveyed in 3D via the user's interpretation of the provided images via stereoscopic effects. In order to properly view the stereoscopic images (one for each eye for each image frame), the user may wear eyewear 140. Eyewear 140 may be any of anaglyph glasses, polarized glasses, shutter glasses, lenticular glasses, etc., among others.

In some embodiments, eyewear 140 may be used as a position input device to track the user view (e.g., eyepoint or point of view (POV)) of a user viewing a 3D scene presented by the system 100B. For example, eyewear 140 may provide information (e.g., position information, which includes orientation information, etc.) that is usable to determine the position of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position data suitable for the head tracking. The input device(s), such as a stylus, keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position of the display 150 and the point of view of the user may be used to map a portion of the virtual space to the physical space of the system 100B. In essence, the physical space and components used may be mapped to the virtual model in order to accurately render a 3D scene of the virtual space.

One or more of the user input devices (e.g., the keyboard 120, the trackpad 135, the user input device 130, pointing device, user control device, user hand/fingers, etc.) may be used to interact with the presented 3D scene. For example, the user input device 130 (shown as a passive stylus) or simply the user's hands may be used to directly interact with virtual objects of the 3D scene (via the viewed projected objects). Such direct interaction may be possible with negative space portions of the 3D scene. In some embodiments, at least a portion of the 3D scene may be presented in this negative space, which is in front of or otherwise outside of the at least one display, via stereoscopic rendering (of the 3D scene). In some embodiments, at least a portion of the 3D scene may appear as a hologram-like image above the surface of the display 150. It should be noted, however, that a portion of the 3D scene may also be presented as appearing behind the display surface, which is in positive space. Thus, negative space refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, negative space may be considered to be a "hands-on volume" as opposed to an "inner-volume" (i.e., positive space), which may be under the surface of the display(s), and thus not accessible. Thus, the user may interact with virtual objects in the negative space because they are proximate to the user's own physical space. Said another way, the positive space is located behind (or under) the viewing surface, and so presented objects appear to be located inside (or on the back side of) the physical viewing device. Thus, objects of the 3D scene presented within the positive space do not share the same physical space with the user and the objects therefore cannot be directly and physically manipulated by hands or physically intersected by hand-held tools such as user input device 130. Rather, they may be manipulated indirectly, e.g., via a computer mouse, a joystick, virtual representations of hands, handheld tools, or a stylus, or by projections from the stylus (e.g., a virtual laser or a virtual plane).

In some embodiments, system 100 may include one or more sensors 160. The one or more sensors 160 may be included in a tracking system. FIG. 3B illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, fewer than four sensors may be used (e.g., two sensors), wherein each sensor may track both the user (e.g., the user's head and/or the user's point of view) and the user input device. Sensors 160 may be used to image a user of system 100B, track a user's movement, or track a user's head or eyes, among other contemplated functions. In one embodiment, cameras 160 may track a position and/or an orientation of user input device 130. The information regarding the position (including the orientation) of the user input device 130 provided by the one or more sensors 160 may be used to perform 3D tracking of the user input device 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination.

In some embodiments, the system 100B may be configured to couple to a network, such as a wide area network, via an input or interface (wired or wireless). The input may be configured to receive data (e.g., image data, video data, audio data, etc.) over the network from a system similar to systems 100A or 100B. In other embodiments, a tracking system may include cameras 160. Cameras 160 may be configured to provide visual information regarding a user (e.g., such that a POV, e.g., the position (including the orientation), of the user may be determined or such that a position of the user's hand may be determined). However, it should be noted that any type of various tracking techniques or devices may be used as desired. Note that as used herein, POV of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three location coordinates and three orientation coordinates, although any POV may be used as desired, e.g., three location coordinates and two or three orientation coordinates, and so forth. As noted above, position coordinates may include both location and orientation coordinates.

Note that in some embodiments, the tracking system may rely at least in part on the components of chassis 110B to determine a position or a POV, e.g., via execution of one more programs by or on a processor or functional unit of chassis 110B, although in other embodiments the tracking system may operate independently, e.g., may have its own processor or functional unit.

In certain embodiments, the system may include components implementing a perspective-based image capture system, for capturing images of a target object at a location remote from the system. For example, the perspective-based image capture system may include an input configured to couple to a network for receiving information regarding a point of view (POV) from a tracking system at a remote location. The information regarding the POV may indicate a position of a remote user. The perspective-based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display 150. A view of the 3D scene may be presented based on the virtual viewpoint, either by one or more of the display 150 or another display, as desired. This view of the 3D scene may be stereoscopic or monoscopic, as desired.

A 3D scene generator (e.g., content processing system) stored and executed in the chassis 110B may be configured to dynamically change the displayed images provided by the display 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit, procedure, and/or fiducial markers to ensure proper mapping of the peripheral device to the display images and proper mapping between the projected images and the virtual images stored in the memory of the chassis 110B.

Thus, the system 100B may present a 3D scene with which the user may interact in real time. The system may include real-time electronic display 150 that may present or convey perspective images in the open space, and user input device 130 that may allow the user to interact with the 3D scene with hand controlled or hand-held tools. The system 100B may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

According to various embodiments of the present disclosure, the display 150 may display various types of information (for example, multimedia data or text data) to be provided to the user. The display 150 may be configured to include a liquid crystal display (LCD), a light emitting diode (LED) display, an organic LED (OLED) display, a plasma cell display, an electronic ink array display, an electronic paper display, a flexible LCD, a flexible electrochromic display, or a flexible electro wetting display. The display 150 may be connected functionally to an element(s) of the electronic device. Also, the display 150 may be connected functionally to an electronic device(s) other than the electronic device. According to various embodiments of the present disclosure, the input module 240 may receive an input for controlling an attribute of, for example, a history screen. The input module 240 may receive, for example, an input of 'reference screen setting'. 'Reference screen setting' may involve an operation for storing information related to the screen in the storage module 210 in order to display the reference screen. The input module 240 may receive, for example, an input for displaying the reference screen. Attributes of the screen may include, for example, at least one of the position of the reference screen, a sound volume for the reference screen, brightness of the screen, and the size of the screen. If the input module 240 is included in a second electronic device, the input module 240 may not be provided in the electronic device according to various embodiments of the present disclosure.

Figure 4:
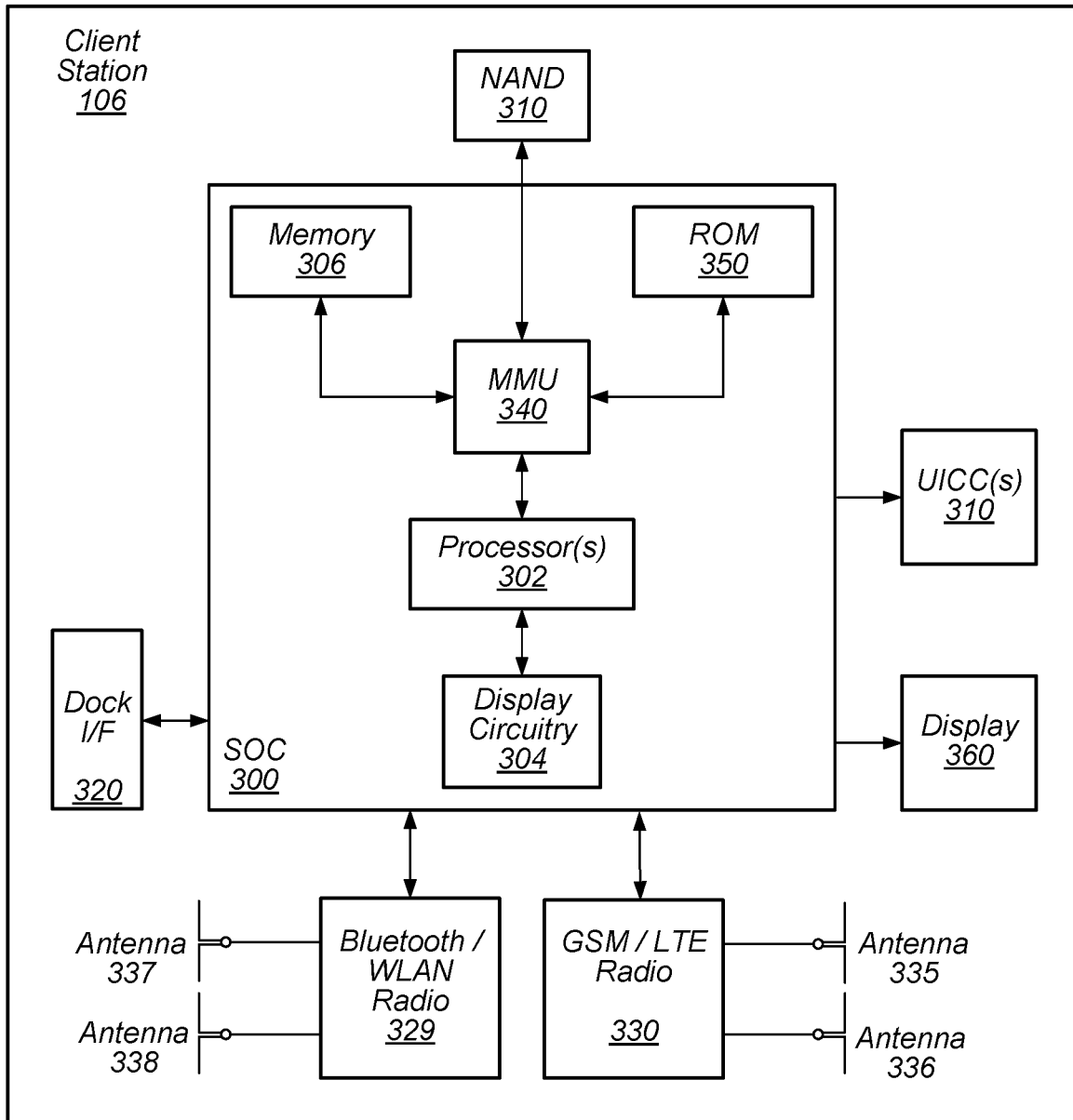
FIG. 4 illustrates an example block diagram of a user equipment device configured according to some embodiments.

FIG. 4 illustrates an example simplified block diagram of a wireless station 106. According to embodiments, wireless station 106 may be a user equipment (UE) device, a mobile device and/or mobile station. Wireless station 106 may be used in conjunction with the system described above in reference to FIGS. 3A and 3B and the systems described below in reference to FIGS. 5B and 5C. For example, wireless station 106 may be configured as an input device to any of the described systems (e.g., wireless station 106 may be configured as a user input device). As another example, according to some embodiments, wireless station 106 may be configured as a display of any of the described systems. Thus, wireless station 106 may be configured to display a stereoscopic image. In some embodiments, wireless station 106 may be configured to communicate with a 3D system either wirelessly (e.g., via a local area network such as a Wi-Fi, Bluetooth, or Bluetooth low energy connection) or via a wired interface such as a universal serial bus interface, among other wired interfaces. In some embodiments, wireless station 106 may be included in a computer system, such as computer system 100B described above.

As shown, the wireless station 106 may include a system on chip (SOC) 300, which may include portions for various purposes. The SOC 300 may be coupled to various other circuits of the wireless station 106. For example, the wireless station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The wireless station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the wireless station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As described herein, the wireless station 106 may include hardware and software components for implementing the features described herein, e.g., the wireless station 106 may form at least part of a 3D display system such as system 100 described above and/or systems 500A and 5B described below. For example, the processor 302 of the wireless station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Figure 5A:
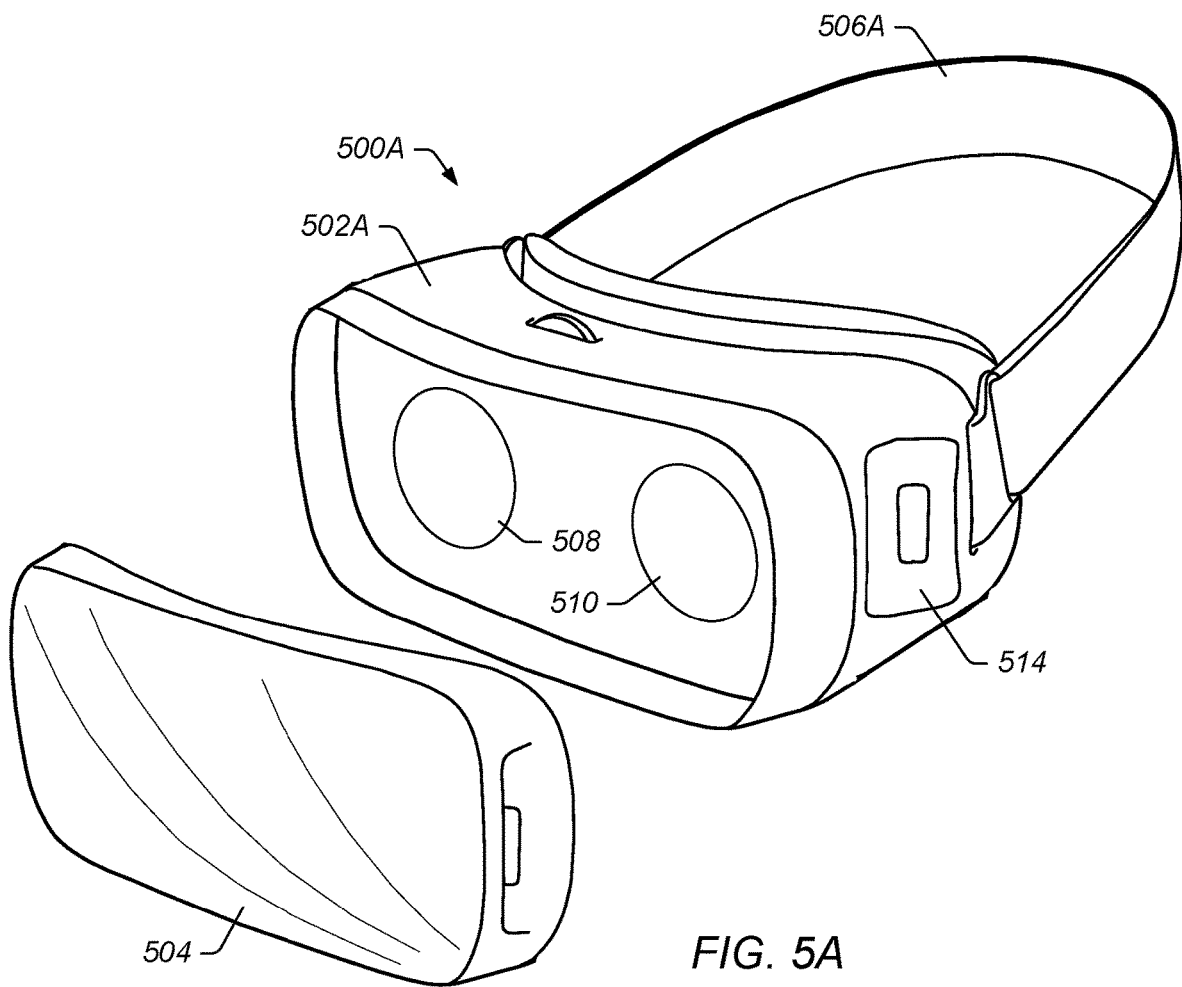
FIGS. 5A and 5B illustrate examples of a 3D head-mounted stereoscopic display system configured according to some embodiments.

Referring to FIG. 5A, a head-mounted electronic device 500A may include a body 502A and a cover 504. The body 502 may include lenses 508 and 510, and a control device 514. In addition, electronic device 500A may include a support 506A which may be configured to support electronic device 500A on a user's head. Lenses 508 and 510 may be positioned to correspond to eyes of a user. The user may view a screen on a display through lenses 508 and 510. The display may be coupled or connected to electronic device 500. In some embodiments, the display may be included on (or in) cover 504 and cover 504 may be configured to couple to body 502A. In some embodiments, electronic device 500B may include a display, such as display 150A or 150B described above in reference to FIG. 4. Thus, cover 504 may be communicatively coupled to body 502A (e.g., to couple a display of cover 504 to a processor of electronic device 500) and mechanically coupled (e.g., attached to) body 502. In some embodiments, the communicative coupling between body 502A and cover 504 may be wired and/or wireless.

In some embodiments, control device 514 may be located on a side surface of body 502A. Control device 514 may be used for the user to enter an input for controlling the head-mounted electronic device 500A. For example, control device 514 may include a touch panel, a button, a wheel key, and/or a touch pad. The touch panel may receive the user's touch input. The touch input may be a direct touch input to the touch panel or a hovering input in the vicinity of the touch panel.

Figure 5B:
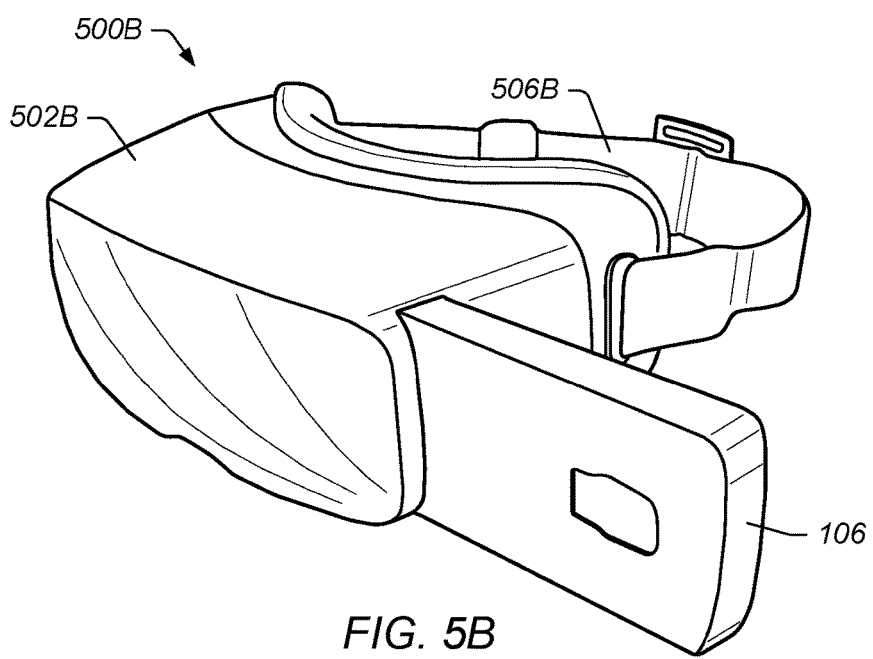

Turning to FIG. 5B, a head-mounted electronic device 500B may include a body 502B and a support 506B. Body 502B may be configured to couple to a wireless station and a display of electronic device 500B may be a display of a wireless station, such as wireless station 106, and the wireless station may be coupled or connected to (e.g., may be detachably mounted to) electronic device 500B. In other words, electronic device 500B may be configured such that a wireless station may be non-permanently coupled to, and removable without destructive measures, to electronic device 500B. Thus, electronic device 500B may be coupled to and decoupled from (e.g., non-destructively decoupled from) a wireless station without a change in functionality of the wireless station or electronic device 500B.

Figure 5C:
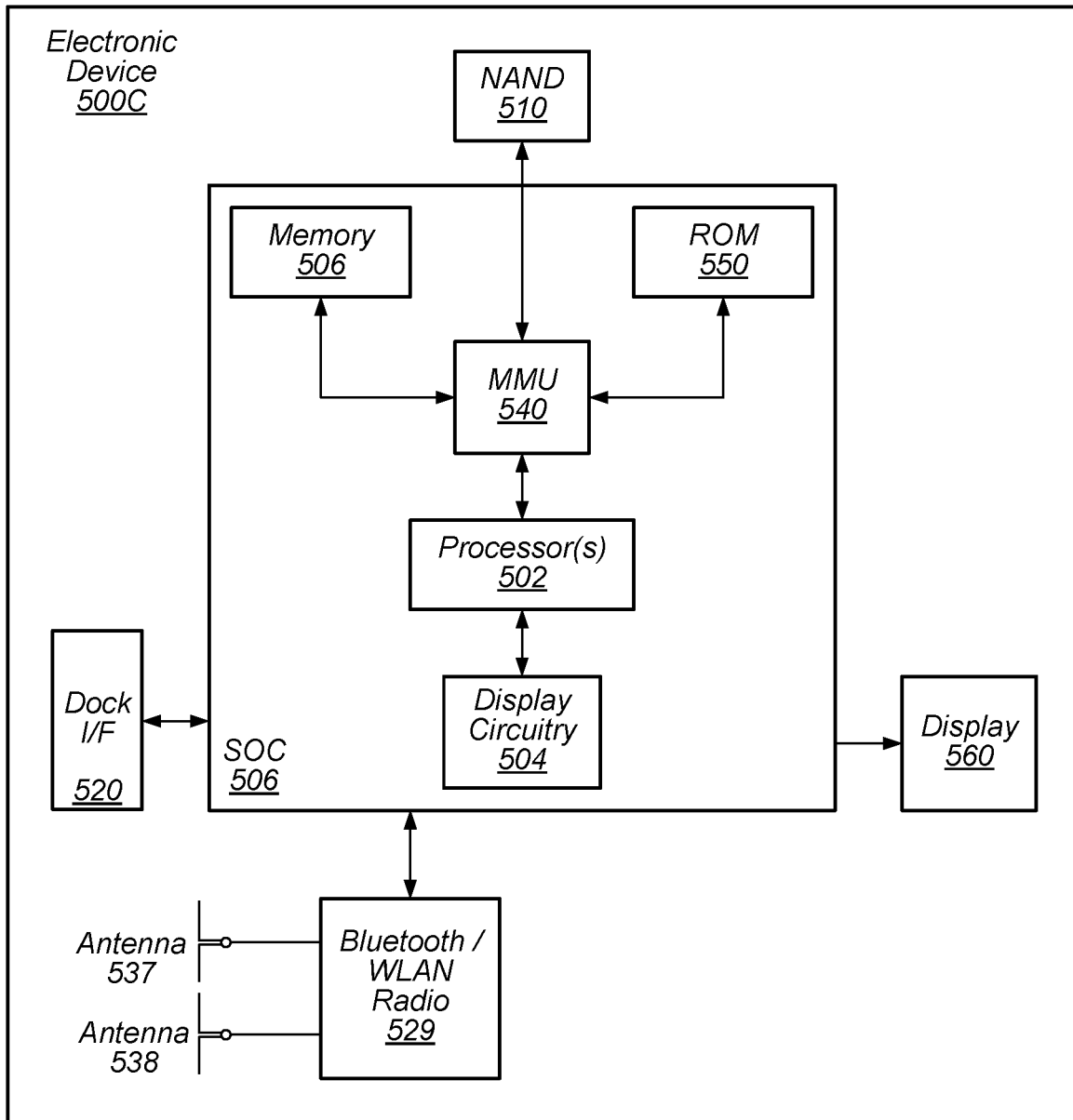
FIG. 5C illustrates an example block diagram of a head-mounted electronic device configured according to some embodiments.

Turning to FIG. 5C, FIG. 5C illustrates an example simplified block diagram of a head-mounted electronic device 500C. According to embodiments, electronic device 500C may be include a display (e.g., such as electronic device 500A) or may be configured to couple to wireless station (e.g., such as electronic device 500B). Note that electronic devices 500A and 500B described above may include at least portions of the features described in reference to electronic device 500C.

As shown, the electronic device 500C may include a system on chip (SOC) 506, which may include portions for various purposes. The SOC 506 may be coupled to various other circuits of the electronic device 500C. For example, the electronic device 500C may include various types of memory (e.g., including NAND flash 510), a connector interface (I/F) (or dock) 520 (e.g., for coupling to a computer system, dock, charging station, external display, etc.), the display 560 (note that is some embodiments, electronic device 500C may not include display 560), and short to medium range wireless communication circuitry 529 (e.g., Bluetooth™ and WLAN circuitry). The short to medium range wireless communication circuitry 529 may also couple to one or more antennas, such as antennas 537 and 538 as shown. The short to medium range wireless communication circuitry 529 may include multiple receive chains and/or multiple transmit chains for receiving and/or transmitting multiple spatial streams, such as in a multiple-input multiple output (MIMO) configuration.

As shown, the SOC 506 may include processor(s) 502, which may execute program instructions for the electronic device 500C and display circuitry 504, which may perform graphics processing and provide display signals to the display 560 (and/or to dock 520). The processor(s) 502 may also be coupled to memory management unit (MMU) 540, which may be configured to receive addresses from the processor(s) 502 and translate those addresses to locations in memory (e.g., memory 506, read only memory (ROM) 550, NAND flash memory 510) and/or to other circuits or devices, such as the display circuitry 504, short range wireless communication circuitry 529, connector interface (I/F) 520, and/or display 560. The MMU 540 may be configured to perform memory protection and page table translation or set up. In some embodiments, the MMU 540 may be included as a portion of the processor(s) 502.

In some embodiments, electronic device 500C (and/or an electronic device such as electronic device 500A or 500B) may be in communication with a user input device, such as user input device 130 described above. In some embodiments, the electronic device may receive user input via user input device 130 as described above.

In addition, in some embodiments, electronic device 500C may include one or more positional sensors such as accelerometers, gyroscopic sensors, geomagnetic sensors, magnetic sensors, proximity sensors, gesture sensors, grip sensors, and/or biometric sensors. In some embodiments, the electronic device may acquire information for determining a motion of a user wearing the electronic device and/or whether a user wears or removes electronic device 500C, using the one or more positional sensors. The at least one processor may control execution of a function(s) or an operation(s) corresponding to an input received through a control device (for example, control device 514 and/or user input device 130) in response to a received input.

As described herein, the electronic device 500C may include hardware and software components for implementing the features described herein, e.g., the electronic device 500C may form at least part of a 3D display system such as system 100 described above and/or systems 500A and 5B described below. For example, the processor 502 of the electronic device 500C may be configured to implement part or all of the features described herein, e.g., by executing program instructions stored on a memory medium (e.g., a non-transitory computer-readable memory medium). Alternatively (or in addition), processor 502 may be configured as a programmable hardware element, such as an FPGA (Field Programmable Gate Array), or as an ASIC (Application Specific Integrated Circuit). Alternatively (or in addition) the processor 502 of the UE 106, in conjunction with one or more of the other components 500, 504, 506, 510, 520, 535, 550, 560 may be configured to implement part or all of the features described herein.

In some embodiments, electronic device 500C may include or be in communication with one or more external cameras. For example, electronic device 500C may include (or be in communication with) one or more cameras (or an array of cameras) that may be configured to capture images of a physical location of a user.

In addition, as described herein, processor 502 may include one or more processing elements. Thus, processor 502 may include one or more integrated circuits (ICs) that are configured to perform the functions of processor 502. In addition, each integrated circuit may include circuitry (e.g., first circuitry, second circuitry, etc.) configured to perform the functions of processor(s) 502.

Figure 6:
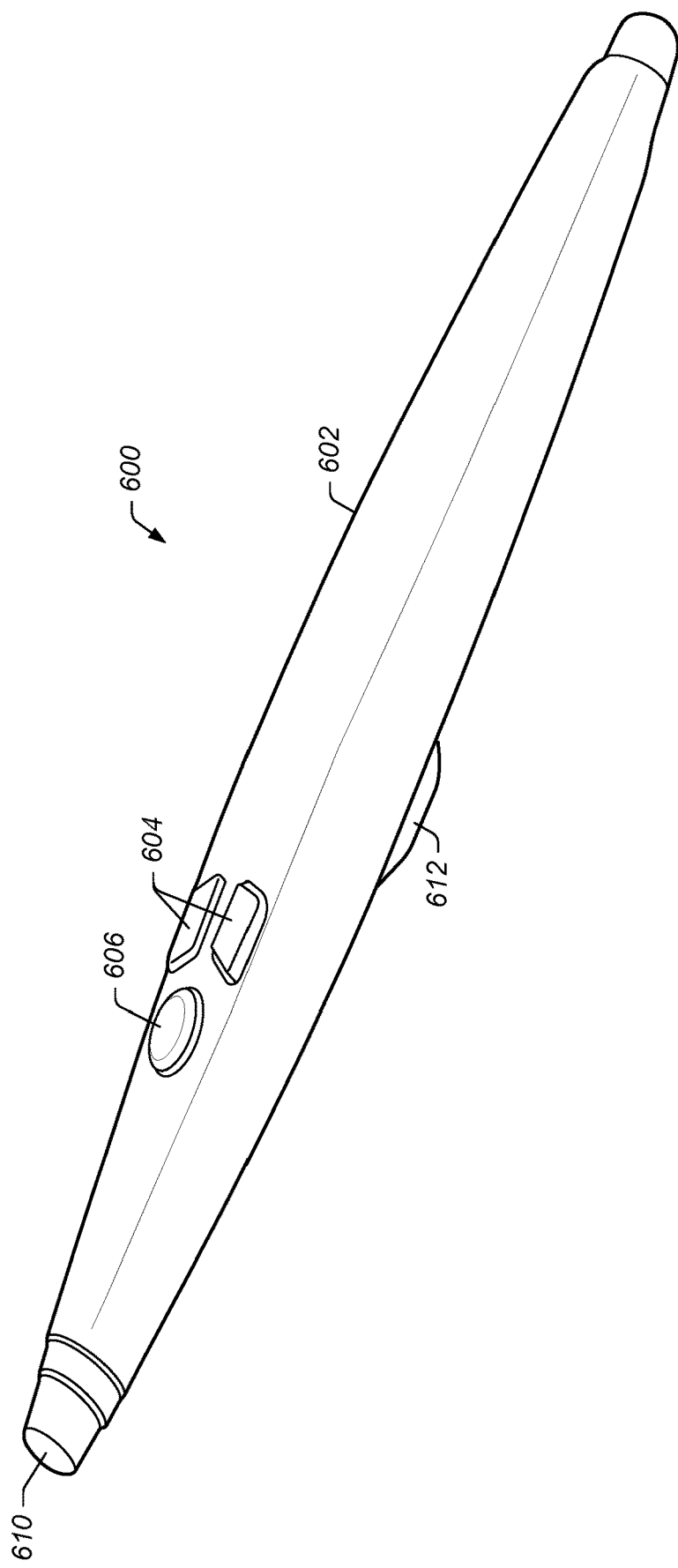
FIG. 6 illustrates an example of a user input device, according to some embodiments.

FIG. 6 illustrates an example of a user input device, according to some embodiments. As shown, a user input device 600 may be configured to perform various embodiments as described herein. User input device 600 may be similar to or the same as user input device 130 as described above in reference to FIGS. 4 and 5B-5C. Thus, user input device 600 may be used in conjunction with, or be included in, systems 100A-B and/or systems 500A-B. As described above, systems 100A-B and/or systems 500A-B may have the capability to determine the six-axis position and orientation of user input device 600. Note that this includes the X, Y, Z location of tip 610 of user input device 600 and the α, β, γ angular orientation of body 602 of user input device 600. However, it should be further noted that user input device 600 is exemplary, and that other user input devices, suitably configured, may be used as desired.

As shown, user input device 600 may include buttons 604, 606, and 612. In some embodiments, the buttons 604, 606, and/or 612 may be faux (or dummy) buttons. In other words, buttons 604, 606, and/or 612 may be non-functioning buttons, e.g., a system, such as systems 100A-B and/or 500A-B described herein, may detect a user action of pressing a location of user input device 600 identified by the system as a button location. Hence, in some embodiments, buttons 604, 606, and/or 612 may be identifiable locations (e.g., via a visible marker, a raised area, and/or a dimpled or depressed area). In some embodiments, one of the buttons, such as button 606, may be "depressed" and "held down" to trigger the selection of an object within a 3D scene presented by any of systems 100A-B and/or 500A-B. Additionally, system 100 may be configured to display a virtual "laser like" projection from tip 610 to the selected object. With the object selected, adjustment of the position and/or orientation of user input device 600 may change the position and/or orientation of the object. Thus, movements of the user input device 600 may result in corresponding translations and/or rotations of the object.

Figure 7A:
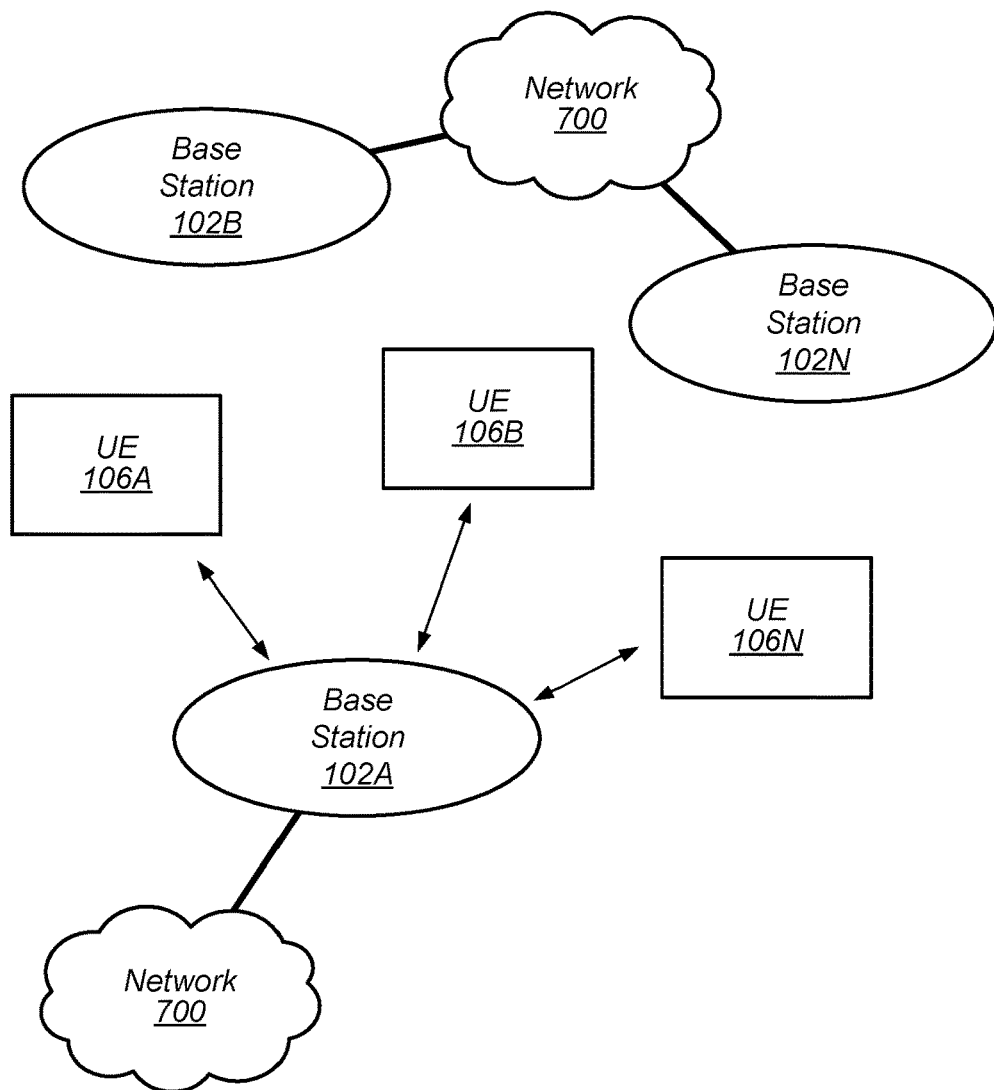
FIG. 7A illustrates an example wireless communication system according to some embodiments.
Figure 7B:
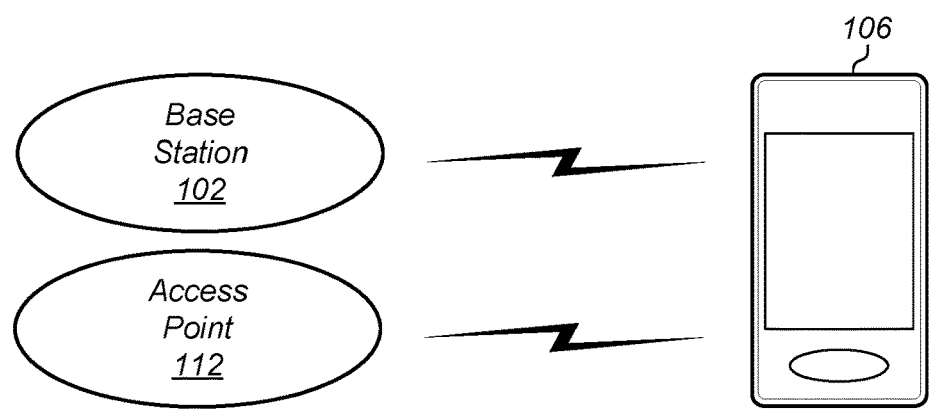
FIG. 7B illustrates an example of a base station and an access point in communication with a user equipment (UE) device, according to some embodiments.

FIGS. 7A and 7B: Communication Systems

FIG. 7A illustrates a simplified example wireless communication system, according to some embodiments. It is noted that the system of FIG. 7A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N, for example computer system 100A. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N, which may include computer system 100A.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as gNodeB' or 'gNB'.

As shown, the base station 102A may also be equipped to communicate with a network 700 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 700. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 7, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 700. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 7B illustrates user equipment 106 (e.g., one of the devices 106A through 106N, which may include computer system 100A) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 8:
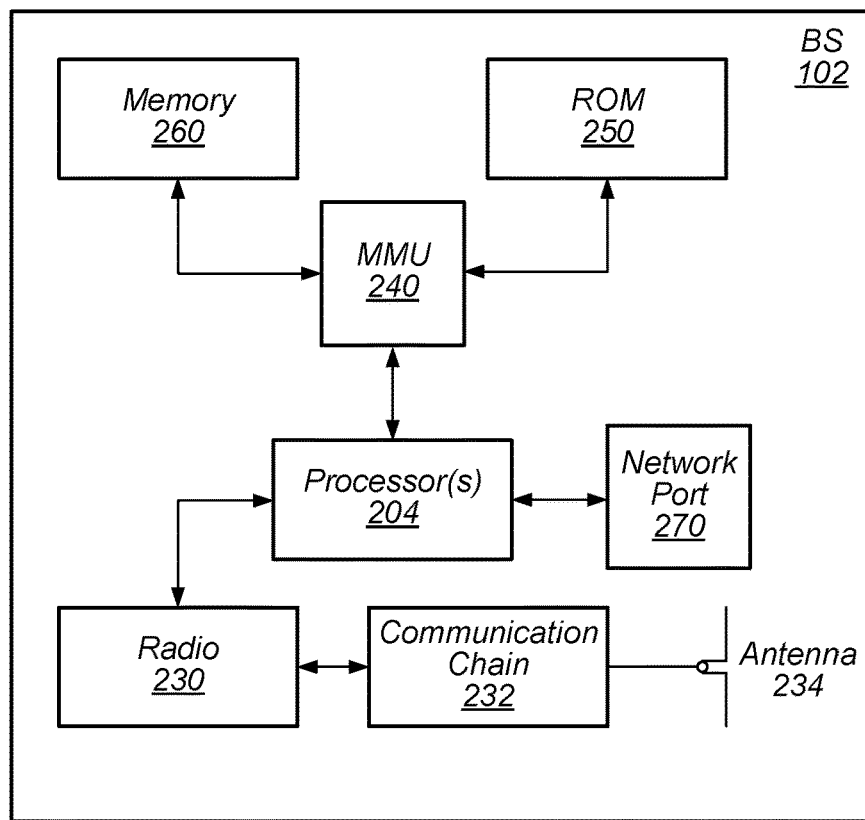
FIG. 8 illustrates an example block diagram of a base station, according to some embodiments.

FIG. 8: Block Diagram of a Base Station

FIG. 8 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 7A and 7B.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

Figure 9:
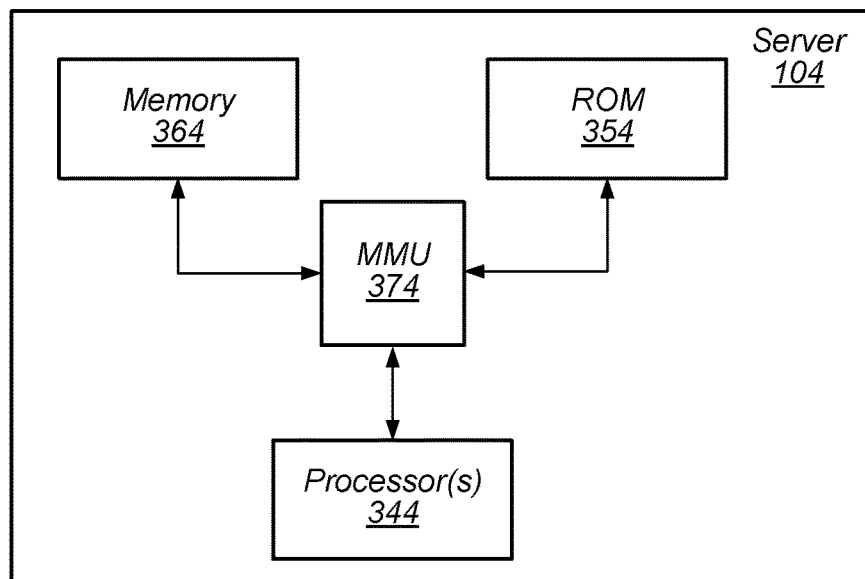
FIG. 9 illustrates an example block diagram of a server, according to some embodiments.

FIG. 9: Block Diagram of a Server

FIG. 9 illustrates an example block diagram of a server 104, according to some embodiments. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, which may include computer systems 100A and 100B, access to network functions and/or network services such as AR/VR rendering support, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network. In some embodiments, the server 104 may not be part of a RAN, e.g., the server 104 may be a third-party server that may interface with the RAN.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements, e.g., such as one or more graphical processing units (GPUs). In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 10:
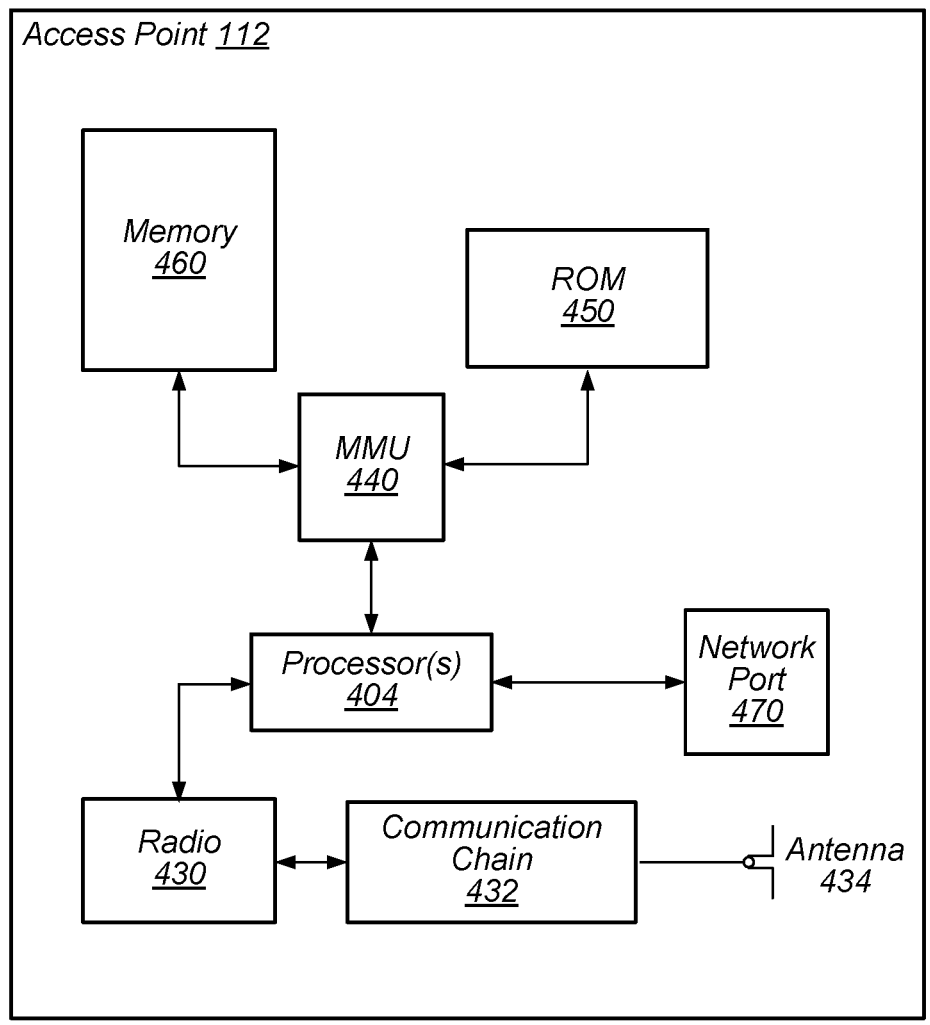
FIG. 10 illustrates an example block diagram of an access point, according to some embodiments.

FIG. 10—Access Point Block Diagram

FIG. 10 illustrates an exemplary block diagram of an access point (AP) 112. It is noted that the block diagram of the AP of FIG. 10 is only one example of a possible system. As shown, the AP 112 may include processor(s) 404 which may execute program instructions for the AP 112. The processor(s) 404 may also be coupled (directly or indirectly) to memory management unit (MMU) 440, which may be configured to receive addresses from the processor(s) 404 and translate those addresses to locations in memory (e.g., memory 460 and read only memory (ROM) 450) or to other circuits or devices.

The AP 112 may include at least one network port 470. The network port 470 may be configured to couple to a wired network and provide a plurality of devices, such as client stations 106, access to the Internet. For example, the network port 470 (or an additional network port) may be configured to couple to a local network, such as a home network or an enterprise network. For example, port 470 may be an Ethernet port. The local network may provide connectivity to additional networks, such as the Internet.

The AP 112 may include at least one antenna 434, which may be configured to operate as a wireless transceiver and may be further configured to communicate with wireless stations 106 via wireless communication circuitry 430. The antenna 434 communicates with the wireless communication circuitry 430 via communication chain 432. Communication chain 432 may include one or more receive chains, one or more transmit chains or both. The wireless communication circuitry 430 may be configured to communicate via Wi-Fi or WLAN, e.g., 802.11. The wireless communication circuitry 430 may also, or alternatively, be configured to communicate via various other wireless communication technologies, including, but not limited to, 3GGP Fifth Generation (5G) New Radio (NR), Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Further, in some embodiments, as further described below, an AP 112 may be configured to perform methods for cloud-based rendering of interactive augmented reality (AR) and/or virtual reality (VR) experiences, e.g., as further described herein.

Cloud-Based Rendering of Interactive AR/VR Experiences

In the current art, there are many different applications which can generate three-dimensional (3D) augmented or virtual reality (AR/VR) scenes. However, there are many issues with the current technology which limit effectiveness and lead to specific devices and/or expensive hardware being required to generate the images and maximize the functionality of the system. Many current 3D applications cannot be efficiently used on smaller devices, such as personal computers, laptops, and/or other UE devices. 3D applications typically require expensive and powerful graphics processing units, or GPUs, to effectively render the pictures to a useful resolution. Most laptops are equipped with low-capability GPUs; thus, many modern 3D applications cannot be effectively deployed on most laptops due to the lack of GPU processing power. In addition, the 3D applications draw a lot of power from the computer, requiring high battery capacity and energy output. This leads to device overheating, which reduces functionality and speed, while also forcing devices to be plugged into an outlet in order to have enough power, which may be an inconvenience. Further, 3D applications are typically very large, meaning they require a significant amount of space on the hard drive of a computer as well as lengthy installation and subsequent update periods. Additionally, it may be difficult to integrate or retrofit cloud-based save/restore functions into 3D applications and it may be expensive to port 3D applications to different hardware platforms. However, some governments have recently incentivized cloud-based and 5G-based technologies, thus integration of cloud-based technologies is still important. One-to-many broadcasts, e.g., remote education, requires significant upload bandwidth, so the high-speed technology is already present in many areas, especially in education. Schools are one of the leading users of 3D applications and technologies, as they are an effective educational tool. Thus, there is a pressing need for reducing file size, power required by the application, and the graphical needs of the system, while integrating cloud-based technologies.

Embodiments described herein provide systems, methods, and mechanisms for cloud-based rendering of interactive augmented and/or virtual reality experiences on a variety of devices, e.g., to overcome current technical design and execution challenges as described above.

Figure 11:
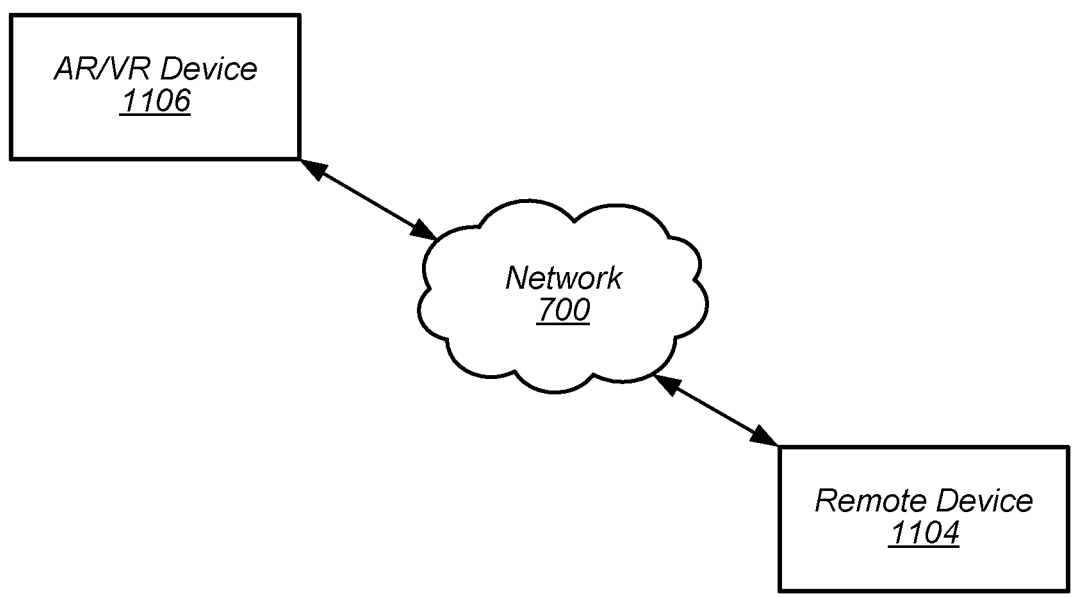
FIG. 11 illustrates an example of a system for cloud-based rendering of an interactive AR/VR experience, according to some embodiments.

In some embodiments, an augmented reality/virtual reality (AR/VR) device 1106, which may be a device 100A, 100B, 106, 500A, 500B, and/or 500C as described herein, may include user position and/or orientation tracking capabilities, such as head and/or eye tracking and/or user input device tracking (e.g., such as tracking a stylus 600 and/or user hand tracking). As illustrated by FIG. 11, the AR/VR device 1106 may act as a local terminal, or client device. The client device (e.g., local terminal) may be a wireless device, such as UE 106. A remote device 1104, which may be headless and/or virtualized in a cloud (e.g., stored and executed on a server, such as server 104, where the server may be part of a network, such as network 700 described above, or in communication with such a network), may act as a content application host, or server device. The server device (e.g., content application host) may be a server 104. As shown, between these two endpoints may be a network (e.g., such as network 700), such as a LAN or WAN (e.g., a series of fiber, cable, Wi-Fi, and/or mobile connectivity such as 3GPP 4G or 5G networks, and/or any other type of network). For example, AR/VR device 1106 may access network 700 via a base station, such as base station 102, and/or an access point, such as access point 112.

The AR/VR device 1106 (e.g., client device) may operate in various operational states that may be mirrored and/or mimicked by the remote device 1104 (e.g., server device). For example, both the client device and the remove device may operate (or exist) in an idle state. The idle state may refer to an operational state in which the client device disconnected from the server device and/or an operational state in which the server device is ready and waiting for clients to connect. As another example, the client device and server device may operate (or exist) in a browsing state. The browsing state may refer to an operational state in which the client device has an active connection to the server device, the server device reporting back to the client device which content applications are available to use, and/or the client device using this information to provide a user with content options. In other words, the browsing state may refer to an operational state in which the client device solicits the server device for content options to present to a user and/or an operational state in which the server device advertises (either solicited or unsolicited) content options to the client device for presentation to a user. As a further example, the client device and the server device may operate (or exist) in an executing state. The executing state may refer to the client device maintaining an active connection to the server device, the server device executing a specific content application, receiving user input from the client device, rendering the content to a virtual buffer and transmitting that buffer to the client device, and/or the client device presenting that buffer on-screen in continuous animation.

For example, while in the browsing and/or executing state, the client device may signal the server, e.g., to indicate which content application (as the server may host multiple content applications) the server should begin executing. Additionally, the client device may transmit, to the server, information about the local client device. For example, the information transmitted to the server may include information such as a display size of the client device, a display resolution of the client device, a display model of the client device, system specifications of the client device, system serial numbers of the client device, and/or system language/locale of the client device, among other information. Further, the client device may create a local stereoscopic-enabled window and/or full-screen surface in preparation for display of a 3D scene. In addition, the client device may initialize a tracking sub-system, e.g., such as for head tracking, eye tracking, and/or user tracking. In at least some instances, the client device may await confirmation from the server that the content application is executing. Moreover, for predictive tracking and reprojection purposes (discussed later), the client device and the server may synchronize to one another. In other words, the client device and the server may ensure a system clock of the client device is synchronized to a system clock of the server. For example, the client device and the server exchange current system clock values in order to compute an offset or synchronization value thereby allowing for adjustments of a time domain of the client device with respect to a time domain of the server and/or vice versa.

In addition, once the above "initialization sequence" has been completed, the client device may begin periodic performance of tasks to display the 3D scene. For example, the client device may receive tracking state information from the tracking sub-system, e.g., such as a tracking state, quality, and/or poses for head tracking, eye tracking, and/or user tracking, along with a timestamp value from the system clock in the client time domain. In some embodiments, the tracking state information may also include a suggested frame number and/or a tracking data sequence number. Then, the client device may encode the tracking state information and transmit the tracking state information to the server, including encoding all keyboard and mouse event and/or state information, and transmit the information to the server. The client device may receive from the server an encoded image and/or video frame. In some embodiments, the client device may also receive an echo of the client device suggested frame number and/or the tracking data sequence number. Further, the client device may receive a timestamp value indicating the time the client device tracking data was received (in a server time domain) and a value indicating the time the encoded image and/or video frame was rendered by the server (in a server time domain). Note that the additional information, e.g., the echo of the client device suggested frame number, the tracking data sequence number, the timestamp value, and the value indicating the time the encoded image and/or video frame was rendered, may be appended to the encoded image and/or video frame, included in a header of the encoded image and/or video frame, or separately encoded and transmitted to the client device. Additionally, the client device may decode the video frame, included any header information, appended data, or additional data transmissions, and transform the video frame into a locally-compatible stereoscopic format. For example, the client device may decode and transform the video frame received from the server using at least one of: double-wide format to time-sequential quad buffer format (QBS), half-width per eye format to time-sequential quad buffer format, double-wide to half-width, half-width to double-wide, interweaved (or interleaved) to time-sequential, time-sequential to interweaved (or interleaved), interweaved (or interleaved)

to double-wide, double-wide to interweaved (or interleaved), and/or time-sequential (L/R) to time-sequential (R/L) and/or vice versa. The client device may present the decoded video in the locally-compatible stereoscopic format. The client device may periodically perform these tasks multiple times per second, e.g., 30, 60, 120, 240, 480, and/or 960 times per second, among other periodicities. The periodic performance may continue until the client device receives a notification from the server indicating the content application has been closed (e.g., terminated), which itself may be in response to the client sending a 'close' request to the content running on the server.

Note that the periodicity may depend on various factors, including hardware properties of the client device, available network capacity and/or bandwidth between the client device and server, as well as other factors, such as client device relationship with the server and/or content application provider. For example, the client device may have a paid subscription with the content application provider allowing for premium performance as compared to non-paying subscriptions. As an example, premium performance may include access to a leased network slice that guarantees and/or allows a higher bandwidth to support periodicities greater than 30 times per second whereas non-paying subscriptions may not have access to the leased network slice, thus, periodicities may not exceed 60 frames per second and/or may not be guaranteed.

As another example, while in the executing state, the server may await connection from a new client device. For example, the server may await a request from a connected client device to open a content application, e.g., such as signaling from the connected client device indicating which content application (as the server may host multiple content applications) the server should begin executing. Additionally, the server may receive and cache information from the connected client device. The information received from the connected client device may include information such as a display size (e.g., in meters, inches, feet, and so forth) of the connected client device, a display resolution of the connected client device (e.g., in pixels), a display angle and/or orientation, a display model of the connected client device, system specifications of the connected client device, system serial numbers of the connected client device, and/or system language/locale of the connected client device, among other information. The server then may use the received information to ensure the stereoscopic content is correctly rendered on the server-side for viewpoint, field of view, and other 3D projection parameters as a function of the client's display size and state.

In at least some instances, the server may host multiple client connections, and execute multiple content sessions, concurrently. In such cases, multiple, isolated simulated tracking or simulated AR/VR devices may be active on the server. Each active content session may be multiplexed on a server GPU, or the server may have multiple GPUs with general n-to-m (n content sessions rendered by m GPUs) multiplexing of content rendering. The server may be configured with a limit, or may dynamically adjust the limit, of concurrent sessions, e.g., according to and/or based on the content being executed. For example, with a dynamic limit, the server may activate and serve seven active sessions of a "low complexity" content application, but serve only three active sessions of a "high complexity" content application; or in a mixed case, may serve two active sessions of a "high complexity" content application simultaneously with two session "low complexity" content applications. These limits on sessions may be based, at least in part, on real-time system monitoring of available (unused) bandwidth and available (unused) GPU capability and/or system RAM, CPU capability, and/or fixed limits. Further, if and/or when a server has reached capacity and is unable to serve additional client devices at the moment, the server may redirect the client device to another server with known unused capacity. In addition, if and/or when a server has detected that a content session with an existing client device is idle (no recent activity/inputs from the user), the server may dynamically de-prioritize (or lower rendering frame rate) the content session with the existing client device at least until the user becomes active again and/or the server may disconnect the client device if idle too long, e.g., in order to improve the quality of other active client device sessions on the server.

In at least some instances, the server may initialize an instance of a simulated tracking or simulated AR/VR device sub-system using and/or based, at least in part, on the information received from the connected client device. In addition, the server may initialize an instance of an operating system (OS) application programming interface (API) hook environment using and/or based, at least in part, on the information received from the connected client device. Further, the server may launch the requested and/or indicated content application. Note that the content application may be launched using any necessary command-line arguments. Note additionally, the server may attach the launched program to the simulated tracking instance and OS API hooking instance.

In addition, once the server has completed the above "initialization sequence", the server may receive tracking state information from the connected client device, e.g., such as a tracking state, quality, and/or poses for head tracking, eye tracking, and/or user tracking. Then, the server may update the simulated tracking sub-system with the received tracking state information. Further, the server may receive keyboard and/or mouse events and/or state information from the connected client device. The server may update the OS API hook environment with the keyboard and/or mouse events and/or state information received from the connected client device. Additionally, the server may await a signal from the content application that a new image or video frame is ready. Then, the server may extract left and right eye sub-images from the content application, e.g., according to a method for rendering specified by the content application. The sub-images may include a left image and a right image. In at least some instances, the content application may be a quad-buffer stereo application. Thus, the server may extract a left back buffer frame and a right back buffer frame and combine the left and right back buffer frames into a double-wide combined image or a half-width per eye combined image. In other instances, the content application may be rendering in a double-wide or a half-width per eye format and the server may take the full combined image as rendered by the content application. In yet other instances, signals may be passed during launch of the content application on the server to separately and explicitly opt out of time sequential stereo rendering and/or opt into side-by-side stereo rendering. In response to the side-by-side signal, virtual left and right cameras of the content application may draw their respective images at half width to the left and right sides of the output image, respectively. The server may have a rendering resolution that is unrelated to the resolution of the client. For example, the client device may have a resolution of 1920×1080 while the server renders at one of 1600×900 or 3200×900. In some embodiments, the server display's pixel width resolution may be set to double that of the connected client devices system's resolution. Additionally, application elements which may derive properties from the server display's pixel resolution (e.g., screen-aligned 2-dimensional interfaces) may be supplied half pixel width of the server and/or the true width of the connected client device's display. The client and server may also change their agreement on resolution dynamically based on network conditions. In some instances, the server may encode the combined image into a video format such as H264, among other formats. The video may be encoded using on-CPU, on-GPU, and/or hardware acceleration. The server may transmit the video frame to the connected client device. Note that the server may perform these tasks multiple times per second, e.g., 30, 60, 120, 240, 480, and/or 960 times per second, among other periodicities. In addition, the server may dynamically choose a video frame rate according to quality (e.g., bandwidth and/or latency) of the client device's connection to the server, preferences received by the client device, preferences received by the server environment and/or cloud environment, and/or a number of client devices (e.g., a number of content applications) concurrently connected to the server. The periodic performance may continue until the server receives a quit signal from the content application, e.g., indicating the content application has been closed (e.g., terminated). Note additionally, that the server may perform all of the above tasks for each of a plurality of connected client devices. Thus, the server may have multiple connected client device in parallel operating content applications. In some embodiments, for interwoven stereoscopic format (e.g., such as needed for lenticular based auto-stereoscopic displays), a re-weaving step and optional re-estimation step may also be performed.

Note that at least in some instances, content applications may be made available on the server using an automatic and/or manual process of updating and installing content applications. Content applications may become available to connecting users once on the server. In some instances, a content application may be accessed using an authentication and/or authorization step to confirm the right of the user to use the application (e.g., the content application may require and/or be subscription based).

Figure 12:
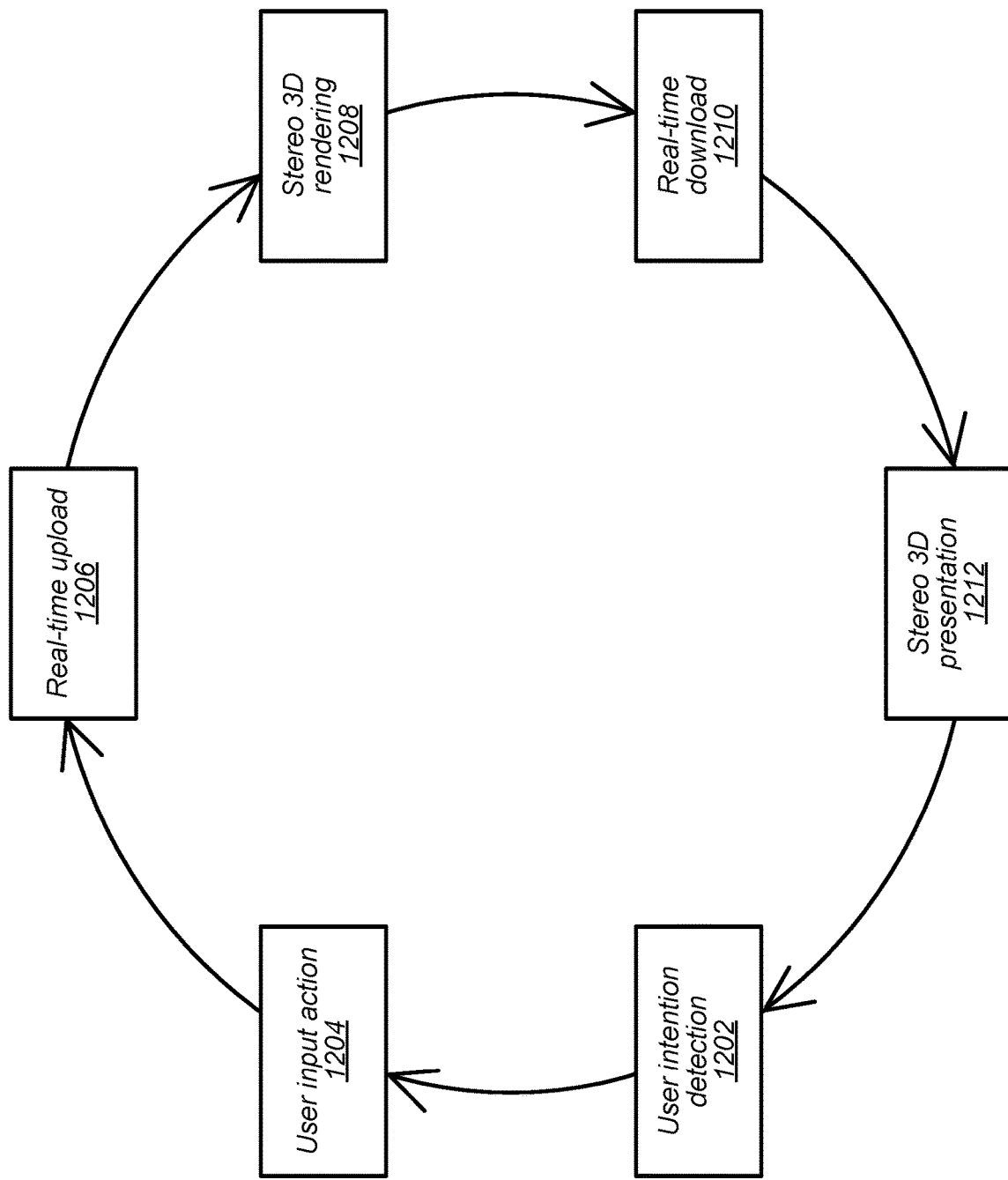
FIG. 12 illustrates an example of a cyclical process for cloud-based rendering of an interactive AR/VR experience, according to some embodiments.

FIG. 12 illustrates an example of a cyclical process for cloud-based rendering of an interactive AR/VR experience, according to some embodiments. The cyclical process shown in FIG. 12 may be used in conjunction with any of the systems, methods, or devices shown in the Figures, among other devices. In various embodiments, some of the cyclical process elements shown may be performed concurrently, in a different order than shown, or may be omitted. Additional cyclical process elements may also be performed as desired. As shown, this cyclical process may operate as follows.

Note that prior to entering this cyclical process, a client device, e.g., such as AR/VR device 1106, may have performed an initialization of a content application hosted by a server, e.g., such as remote device 1104, as described above. Thus, the client device may have provided system information, such as a display size of the client device, a display resolution of the client device, a display model of the client device, system specifications of the client device, system serial numbers of the client device, and/or system language/locale of the client device, among other information. Further, the client device may have created a local stereoscopic-enabled window and/or full-screen surface in preparation for display of a 3D scene. In addition, the client device may have initialized a tracking sub-system, e.g., such as for head tracking, eye tracking, and/or user tracking.

Thus, at 1202, the client device may detect user intention, e.g., via detection of a user action, either via a user input device such as a mouse, stylus, or keyboard, via tracking of the user (e.g., head, eye, hand tracking), and/or via tracking of a user input device (e.g., such as a stylus).

At 1204, the client device may log, record, and determine a user input action, e.g., which may be based on detection of the user intention, and/or log, record, and determine a change to display information, e.g., a change in a display angle and/or orientation. Additionally, the client device may encode the user input action, including the change to display information.

At 1206, the client device may signal (e.g., upload), the user input action to the server, e.g., via a network connection. In some instances, the network connection may be a 3GGP Fifth Generation (5G) New Radio (NR) connection over a cellular and/or non-cellular interface, e.g., via a cellular base station, such as base station 102, and/or via a Wi-Fi access point, such as access point 112. In some instances, the network connection may be a Wi-Fi connection via an access point, such as access point 112.

At 1208, a content application executing on the server may render a 3D scene using one or more GPUs of the server, e.g., based on received display information (e.g., display size and/or display angle and/or orientation) and/or user input action received from the client device. The server may process the rendered 3D scene into left eye images and right eye images.

At 1210, the server may signal (e.g., download), left eye images and right eye images, via the network connection.

At 1212, the client device may display a 3D scene using the left eye images and right eye images received from the server and the cyclical process may be repeated. Note that the cyclical process may be repeated multiple times per second, e.g., 30, 60, 120, 240, 480, and/or 960 times per second, among other periodicities. The periodic performance may continue until the client device receives a notification from the server indicating the content application has been closed (e.g., terminated).

Note that the periodicity may depend on various factors, including hardware properties of the client device, the number of client devices connected to the server, available network capacity and/or bandwidth between the client device and server, as well as other factors, such as client device relationship with the server and/or content application provider. For example, the client device may have a paid subscription with the content application provider allowing for premium performance as compared to non-paying subscriptions. As an example, premium performance may include access to a leased network slice that guarantees and/or allows a higher bandwidth to support periodicities greater than 30 times per second whereas non-paying subscriptions may not have access to the leased network slice, thus, periodicities may not exceed 60 frames per second and/or may not be guaranteed.

Figure 13:
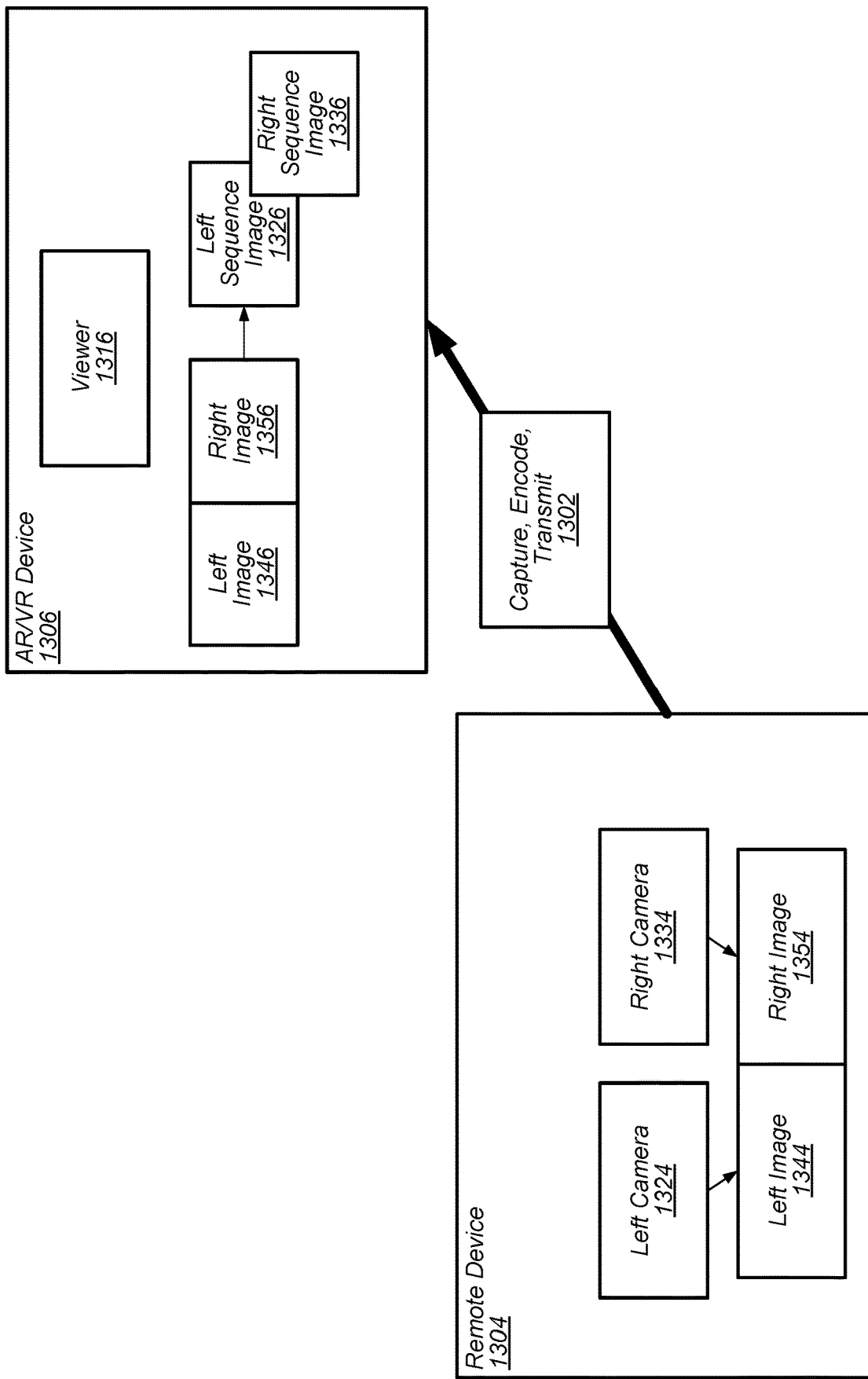
FIG. 13 illustrates an example of a process for providing a client device with left and right images for display as part of an interactive AR/VR experience, according to some embodiments, according to some embodiments.

FIG. 13 illustrates an example of a process for providing a client device with left and right images for display as part of an interactive AR/VR experience, according to some embodiments, according to some embodiments. The process shown in FIG. 13 may be used in conjunction with any of the systems, methods, or devices shown in the Figures, among other devices. In various embodiments, some of the process elements shown may be performed concurrently, in a different order than shown, or may be omitted. Additional process elements may also be performed as desired. As shown, this cyclical process may operate as follows.

Note that prior to entering this process, a client device, e.g., such as AR/VR device 1306 (e.g., which may be an AR/VR device 1106), may have performed an initialization of a content application hosted by a server, e.g., such as remote device 1304 (e.g., which may be a remote device 1104), as described above. Thus, the client device may have provided system information, such as a display size of the client device, a display resolution of the client device, a display model of the client device, system specifications of the client device, system serial numbers of the client device, and/or system language/locale of the client device, among other information. Further, the client device may have created a local stereoscopic-enabled window and/or full-screen surface in preparation for display of a 3D scene. In addition, the client device may have initialized a tracking sub-system, e.g., such as for head tracking, eye tracking, and/or user tracking.

Additionally, signals may be exchanged between the client device and server during launch of the content application on the server to separately and explicitly opt out of time sequential stereo rendering and/or opt into side-by-side stereo rendering. As shown in FIG. 13, in response to signaling indicating side-by-side stereo rendering, virtual left camera 1324 and virtual right camera 1334 of a content application executing on remote device 1304 may draw respective images at half width, e.g., left image 1344 and right image 1354, e.g., to the left and right sides of the output image, respectively. In addition, the remote device 1304 display's pixel width resolution may be set to double that of the AR/VR device 1306 system's resolution. Additionally, content application elements which may derive properties from the remote device 1304's display's pixel resolution (e.g., screen-aligned 2-dimensional interfaces) may be supplied half pixel width of the remote device 1304 and/or the true width of the AR/VR device 1306's display.

At 1302, once drawn, the left image 1344 and right image 1354 may be captured, encoded, and transmitted from remote device 1304 to AR/VR device 1306. Note that the drawing, capturing, encoding, and transmitting may be performed cyclically, e.g., as described above.

Upon receipt of the left image 1344 and the right image 1354, the AR/VR device 1306 may decode the left image 1344 and the right image 1354 thereby generating left image 1346 and right image 1356. The AR/VR device 1306 may then process the left image 1346 and right image 1356 to generate left sequence image 1326 and right sequence image 1336, which then may be rendered and/or displayed via viewer 1316 of AR/VR device 1306.

In some instances, if and/or when network latency is too great, the responsiveness of an input device (e.g., hands and/or stylus) may suffer. Thus, to address the issue of network latency, embodiments described herein may allow for a virtual beam representing the input device to be rendered by a client device (e.g., such as AR/VR devices 1106 and/or 1306) and composited with video streamed from a server (e.g., such as remoted devices 1104 and/or 1304), rather than an executing application on the server rendering the virtual beam (e.g., including the virtual beam with the video streamed from the server). Moreover, in some embodiments, the locally rendered beam may be presented to the user at a frame rate greater than the server rendered content. For example, the server rendered content (e.g., an organ such as a human heart) may be rendered at thirty frames per second (FPS) while the locally rendered stylus beam may be rendered at sixty frames per second. Additionally, the locally rendered stylus beam may benefit from predicted movement of the user allowing for greater perceived system responsiveness, e.g., by using user input device (e.g., stylus and/or pointer/hand device) predictions that are independent of head-tracking or eye-tracking predictions.

For example, as described above a content application may be launched on the server according to a request from the client device. The server may then notify the client that the content application supports the client device rendering a virtual beam from an input device. Additionally, the client device may notify the server that the client device may render (and/or intends to render) the virtual beam. The content application on the server may begin a transmission loop to the client device at a frame rate (e.g., 15, 30, 60, 120, 240, 480 and so forth) that may offer sufficient quality for a more efficient transfer. The server may transmit to the client device data (e.g., 3D visualization information such as mesh, textures, materials, and so forth) for the virtual beam. The server may transmit to the client device a depth map capture of the AR/VR scene, which may use video encoding and/or packing into an RGA master video stream. Then, the client device may update its visualization of the virtual beam. For example, the client device may update a position and/or orientation of the virtual beam according to the local tracking sub-system state. Additionally, the client device may receive and decode the depth map capture from the server and may update a collision point and/or beam length and/or distance of the virtual beam according to the depth map received from the server.

In some instances, if and/or when network latency is too great, the responsiveness of a holographically-correct perspective may be noticeably slower. Moreover, if and/or when network latency variance and/or packet loss is too high, the viewing comfort of the perspective may be noticeably reduced. Further, even in low network latency conditions, local tracking system latencies, as well as server-side rendering latencies, are measurably non-zero and may be perceivable to and/or affecting user experience. Thus, to address these issues, embodiments described herein may allow rendering performance and network conditions to be computed and compensated for via a holistic predictive tracking algorithm, e.g., as an enhancement to wholly-local predictive tracking. Wholly-local predictive tracking is based on physiological assumptions about a target audience of users as well as known ranges on tracking and rendering latencies for locally rendered applications. For example, an enhancement to wholly-local predictive tracking may incorporate additional factors such as empirically measured network reliability according to a trailing window and/or a geographic location of an edge/content delivery network (CDN) cloud facility hosting the server relative to a current location of the user. For example, if an initial time, T0, is the point in time a tracked input physically moved at the client device, (e.g., user's head moves), a first time, T1, may be a time the tracked input may be detected by the client device and new pose coordinates computed locally. Further, a second time, T2, may be a time the new pose coordinates have been used to render a new image on the server (including network upload time) and a third time, T3, maybe a time the new image has been received by the client. Thus, a fourth time, T4, may be a time the new image has been downloaded by the client device, decoded, recomposited (if needed), reprojected (if needed), interweaved (if needed) and presented on the physical display, such that T0<T1<T2<T3<T4. Thus, a purpose the holistic predictive tracking algorithm is to predict at T2 a most optimal (e.g., accurate) prediction for tracking data that would most likely exist at T4. Thus, part or all of the holistic predictive tracking algorithm may execute on the server. In some embodiments, the holistic predictive tracking algorithm may take in into consideration all known or recently estimated latencies and standard deviations for each stage (e.g., T0 to T1, T1 to T2, T2 to T3, and so forth) in order to produce an optimal predicted tracking pose at time T2 for T4 presentation to a user of the client device. For example, these actual or estimated component latencies may be associated with photon capture time in the sensors, tracking processing time in the client processor, network transmission time uploading pose data, rendering time on the server, network transmission time downloading the new image data, decoding time on the client device, and/or display syncing wait time on the client device.

In some instances, if and/or when, network bandwidth is too limited, a frame rate and/or clarity of an overall presentation of an AR/VR scene may suffer. Thus, to address this situation, embodiments described herein may allow a visual presentation may be separated into multiple layers on the server side and each layer may be assigned resolution and/or frame rate priorities. For example, an AR/VR scene may contain at least one element (e.g., a menu user interface (UI), an interactive 3D model, a static/background 3D model, and/or a background image) and a server may render each of the one or more elements into a separate layer. The server may then separately encode each layer according to the frame rate and/or resolution properties for that layer. In some instances, the server may determine that, for a particular layer, no changes have been made and/or that no changes have occurred to a materially important degree. Thus, the server may optimize by not sending changes for the particular layer. In some instances, the client device may receive a separate stream for each layer. The client device may cache over multiple frames and/or resample when necessary. Additionally, the client device may composite a full-resolution and/or full-frame rate image for the user.

Further, in some instances, spatiotemporal filtering and/or artificial intelligence (AI) enhancement techniques may be applied to the resulting image and/or individual layers. Attributes with semantic hints may be incorporated as input options into a spatiotemporal filter or an AI image enhancement. The AI image enhancement may be optimized appropriately for different objects within the image (e.g., text, 2D images, and/or 3D images). In addition, the AI image enhancement may use a recent history of images received to both enhance image clarity and/or increase effective frame rate.

In some instances, if and/or when network bandwidth and/or latency is too poor, a frame rate, clarity, and/or responsiveness of the overall experience may suffer. Thus, to address this situation, embodiments described herein may allow an additional layer of network data transmission management. For example, quality of service (QoS) attributes may be assigned for each of data channel. In some instances, the QoS attributes may be assigned based, at least in part, on existing QoS-enabled TCP/IP network infrastructure. The QoS attributes may be assigned according to user preferences and/or according to directives provided by a server and/or content application. In some instances, download may refer to the transfer of data from the server to the client device and upload may refer to the transfer of data from the client device to the server. The data channels available for this granularity of configuration may include, but are not limited to, head/eye tracking state upload, stylus/hand tracking state upload, mouse/keyboard state upload, final frame video download, and/or download of individual layers.

In some instances, if and/or when transmission from the server to client device is occurring at a low-frame rate, the reprojection of the AR/VR scene may be enhanced to maintain comfortable viewing on the client device side. The reprojection of the scene may be enhanced by utilizing structure from stereo information and/or depth information about a last complete image and/or set of images received from the server. The AR/VR scene may be reprojected according to locally occurring head tracking data that may not have been processed and/or received back from the server. The AR/VR scene may be reprojected using knowledge of the current projection that was used to render the last complete image (e.g., frame), which may be unprojected back into a 3D space. The information may be reprojected into a new perspective according to the local head tracking state. Additionally, gaps may be filled in using neighboring pixels and/or other state of the art techniques.

Similar to the above, reprojection may also be utilized for known (and/or predicted) latency between a timestamp of a tracking state sent to the server, an arrival timestamp of a corresponding image, and a vertical blanking sync or other synchronization delay for final display output on the client device. The client device may maintain a buffer of recently sent tracking state information to the server, and may cross-reference the buffer with incoming frames from the server, e.g., to determine which tracking state was used to generate the incoming frames. The client device may then, knowing the current (newer) tracking state as well as a prediction for the tracking state by the time display synchronization, reproject the received server image to match the predicted position of the user's eyes/head for correct final perspective effects for the stereo image. Note that for time-sequential stereoscopic displays, this algorithm may be performed for each eye independently (e.g., each eye having a different presentation time to the user), or for each eye together. Note that for lenticular displays and/or auto-stereoscopic displays, this algorithm may be performed for the combination of both eyes together (same predicted display time). Further, this algorithm (e.g., reprojection process) may occur at a frame rate higher than that of a negotiated framerate between the client device and the server for the session. For example, the client device server session may be negotiated to be thirty frames per second whereas the local display with reprojection may occur at a higher frame rate such as sixty frame per second, e.g., for more comfortable and responsive viewing.

In some instances, if and/or when a network interruption occurs and/or if and/or when images are taking longer to be received by the client device from the server than anticipated, the reprojection processes described above may be conducted indefinitely, thereby providing a responsive (to head-movement) user experience. For example, the reprojection process may be conducted at least until either a data stream from the server resumes and/or resumes at an expected frame rate and/or the user chooses to exit the experience.

In addition, in some instances, if and/or when a user input device (e.g., stylus) is server-side rendered and not client device-side rendered, then with masking, depth, coordinates, and/or other information about the rendered location of a beam extending from the user input device, latency-correcting reprojection (as described above) may be performed on pixels associated with the beam. In some embodiments, the latency-correcting reprojection of pixels associated with the beam may be separate from other pixels comprising a remainder of a 3D scene. e.g., by using not only predictive tracking and reprojection of the head pose or eye pose information but also using predictive tracking and reprojection of a user input device pose and/or hand pose and associated beam pixels.

Figure 14:
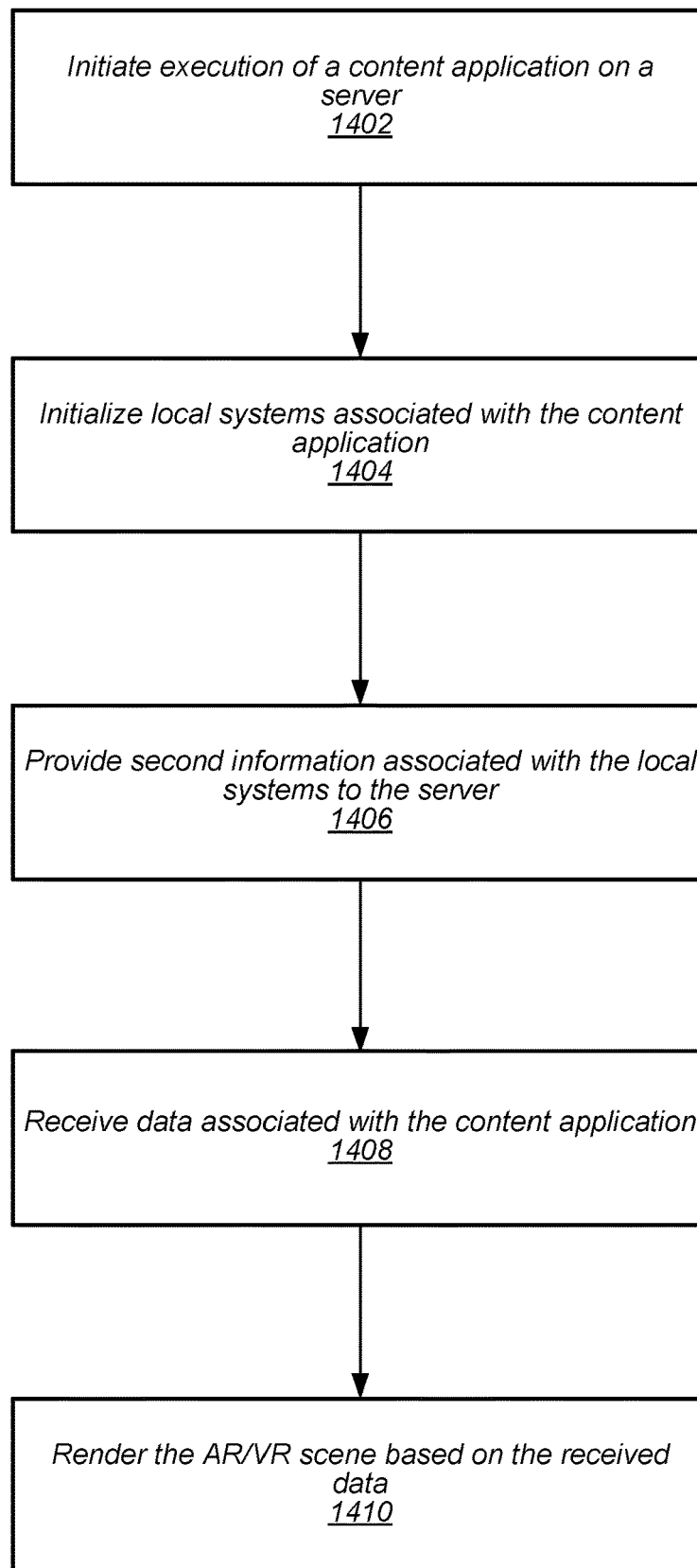
FIG. 14 illustrates a block diagram of an example of a method for cloud rendering an augmented and/or virtual reality (AR/VR) scene, according to some embodiments.

FIG. 14 illustrates a block diagram of an example of a method for cloud rendering an augmented and/or virtual reality (AR/VR) scene, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, a client device, such as AR/VR device 1106 and/or 1306 (and/or more generally, client station 106), may initiate execution of a content application on a server, such as remote device 1104 and/or 1304 (and/or more generally, server 104). The content application may render a three-dimensional (3D) scene for display on one or more displays of the client device. The 3D scene may be considered an AR scene and/or a VR scene. For example, the client device may provide information associated with the content application to the server via a network, e.g., via a wired and/or wireless network connection. As an example, the client device may be attached to a base station, such as base station 102 and may communicate with the server via a 3GPP protocol, such as LTE or 5G NR. In some instances, the client device may be attached to a 5G core network via both cellular and non-cellular connections; thus, the communications with the server may be via both cellular and non-cellular communications. As another example, the client device may be attached to an access point, such as access point 112 and may communication with the server via a Wi-Fi protocol. In some instances, the client device may use a combination of access types (e.g., both a Wi-Fi protocol and a 3GPP protocol) to communicate with the server. Note that the sever may be a part of a core network and/or may be outside of the core network.

In some instances, the information associated with the content application, may be information associated with the client device. For example, the information may include any, any combination of, and/or all of (e.g., one or more of and/or at least one of) a display size of a display of the client device, a display resolution of the display of the client device, a display model of the display of the client device, system specifications of the client device, a system language of the client device, and/or a system locale of the client device.

At 1404, the client device may, while awaiting a notification from the server, initialize local systems and/or local sub-systems associated with the content application. In some instances, initializing the local systems may include the client device creating a local stereoscopic-enabled window or full-screen surface, e.g., rendering the local stereoscopic-enabled window or full-screen surface on the display of the client device. Additionally, initializing the local systems may include the client device initializing tracking sub-systems. The tracking sub-systems may include any, any combination of, and/or all of (e.g., one or more and/or at least one of) a head tracking sub-system, an eye tracking sub-system, and/or a user tracking sub-system. Note that the tracking sub-system may include one or more cameras, e.g., as described above. In some instances, user tracking may include user hand tracking and/or stylus tracking.

At 1406, upon receipt of the notification, the client device may provide, to the server via the network, information associated with the local systems. The notification may indicate (e.g., state) that the content application is executing on the server. In some instances, providing information associated with the local systems may include the client device receiving local tracking system state information from the local systems, encoding the local tracking system state information, and transmitting the local tracking system state information to the server via the network. Additionally, in some instances, providing information associated with the local systems may include the client device encoding user input events and user input state information and transmitting the user input events and user input state information to the server via the network. In some instances, the local tracking system state information may include any, any combination of, and/or all of (e.g., one or more and/or at least one of) head tracking state, eye tracking state, user tracking state, head tracking quality, eye tracking quality, user tracking quality, head tracking poses, user tracking poses, and/or eye tracking poses. In some instances, the user input events may include keyboard events and/or mouse events.

At 1408, the client device may receive, from the server via the network, data associated with the content application. The data may be based on the information associated with the local systems. In some instances, the data may include a left eye image and a right eye image. In some instances, the data may include images for rendering a 3D scene according to any of various image formatting techniques for display of a 3D scene.

At 1410, the client device may render the AR/VR scene (e.g., the 3D scene) based, at least in part, on the received data. 15. In some instances, rendering the AR/VR scene may include the client device receiving an encoded image or video frame from the server, decoding the image or video frame, transforming the image or video frame into an appropriate stereoscopic format, and presenting the decoded image or video frame in the appropriate stereoscopic format on screen. For example, the video frame or image may be transformed into an appropriate stereoscopic format using a transformation from a double-wide format to a time-sequential quad buffer format. As another example, the video frame or image may be transformed into an appropriate stereoscopic format using a transformation from a half-width per eye format to a time-sequential quad buffer format. As a further example, the video frame or image may be transformed into an appropriate stereoscopic format using a transformation from a double-wide format to a half-width format. As a yet further example, the video frame or image may be transformed into an appropriate stereoscopic format using a transformation from a half-width format to a double-wide format. As an additional example, the video frame or image may be transformed into an appropriate stereoscopic format using a transformation from a time-sequential left-to-right format to a time-sequential right-to-left format, or vice versa. As another example, the video frame or image may be transformed into an appropriate stereoscopic format using a transformation from an interweaved (or interleaved) format to a time-sequential format, or vice versa. As a further example, the video frame or image may be transformed into an appropriate stereoscopic format using a transformation from an interweaved (or interleaved) format to a double wide format, or vice versa.

In some instances, the client device may continuously provide information associated with the local systems and receive data associated with the content application. In other words, the client device may periodically perform providing information associated with the local systems and receiving data associated with the content application. In some instances, the client device may continuously provide information associated with the local systems and receive data associated with the content application until a notification indicating that the content application has been closed is received from the server. In some instances, a rate (e.g., periodicity) at which the client device continuously provides information associated with the local systems and receives data associated with the content application may be at least two times per second. In some instances, the rate may be associated with and/or correspond to a display rate of the AR/VR scene, e.g., 30 Hertz (Hz), 60 Hz, 120 Hz, 240 Hz, and so forth. For example, when the AR/VR scene is displayed at 30 Hz (e.g., a frame update rate of 30 times per second), the client device may provide information associated with the local systems and receive data associated with the content application 30 times per second. Similarly, when the AR/VR scene is displayed at 60 Hz and/or 120 Hz (e.g., a frame update rate of 60 and/or 120 times per second), the client device may provide information associated with the local systems and receive data associated with the content application 60 and/or 120 times per second. In some instances, the server may dynamically choose the video frame rate according to quality (bandwidth and/or latency) of the client device's connection to the server, preferences received by the client device, preferences received by the server environment and/or cloud environment, and/or a number of client devices (e.g., a number of content applications) concurrently connected to the server. In some instances, the rate (e.g., periodicity) of providing information associated with the local systems and receiving data associated with the content application may be based, at least in part, on a throughput rate of the network connection between the client device and the server.

In some instances, the client device may receive, from the server, an indication that the content application supports local rendering of a virtual beam from an input device. In other words, the content application may support allowing the client device to locally render the virtual beam based on data received from the content application, e.g., to avoid and/or overcome latency issues associated with display of the virtual beam. In addition, the client device may send, to the server, an indication that the client device intends to render the virtual beam. Further, the client device may receive, from the server, data associated with rendering of the virtual beam. The data associated with rendering of the virtual beam may include three-dimensional (3D) visualization information. For example, the 3D visualization information may include any, any combination of, and/or all of (e.g., one or more of and/or at least one of) mesh data associated with the virtual beam, textures associated with the virtual beam, and/or materials associated with the virtual beam. Additionally, the client device may receive, from the server, a depth map capture of the AR/VR scene, e.g., generated by the content application. The client device may decode the depth map capture of the AR/VR scene and may update visualization of the virtual beam based on the depth map. For example, the client device may update a position and/or an orientation of the virtual beam according to a local tracking system state. As another example, the client device may update at least one of a collision point, a beam length, and/or distance of the virtual beam based on to the depth map capture received from the server.

In some embodiments, the locally rendered beam may be presented to the user at a frame rate greater than the server rendered content. For example, the server rendered content (e.g., an organ such as a human heart) may be rendered at thirty frames per second (FPS) while the locally rendered stylus beam may be rendered at sixty frames per second. Additionally, the locally rendered stylus beam may benefit from predicted movement of the user allowing for greater perceived system responsiveness, e.g., by using user input device (e.g., stylus and/or pointer/hand device) predictions that are independent of head-tracking or eye-tracking predictions In some instances, a movement of a user may be predicted, by the client device, based on physiological assumptions regarding a target audience of users and one or more network factors. The one or more network factors may include any, any combination of, and/or all of (e.g., one or more of and/or at least one of) measured network reliability according to a trailing window, a geographic location of an edge of a cell relative to a current location of the client device, and/or a geographic location of a content delivery network cloud facility hosting the server relative to the current location of the client device.

For example, if an initial time, T0, is the point in time a tracked input physically moved at the client device, (e.g., user's head moves), a first time, T1, may be a time the tracked input may be detected by the client device and new pose coordinates computed locally. Further, a second time, T2, may be a time the new pose coordinates have been used to render a new image on the server (including network upload time) and a third time, T3, maybe a time the new image has been received by the client. Thus, a fourth time, T4, may be a time the new image has been downloaded by the client device, decoded, recomposited (if needed), reprojected (if needed), interweaved (if needed) and presented on the physical display, such that T0<T1<T2<T3<T4. Thus, a purpose the holistic predictive tracking algorithm is to predict at T2 a most optimal (e.g., accurate) prediction for tracking data that would most likely exist at T4. Thus, part or all of the holistic predictive tracking algorithm may execute on the server. In some embodiments, the holistic predictive tracking algorithm may take in into consideration all known or recently estimated latencies and standard deviations for each stage (e.g., T0 to T1, T1 to T2, T2 to T3, and so forth) in order to produce an optimal predicted tracking pose at time T2 for T4 presentation to a user of the client device. For example, these actual or estimated component latencies may be associated with photon capture time in the sensors, tracking processing time in the client processor, network transmission time uploading pose data, rendering time on the server, network transmission time downloading the new image data, decoding time on the client device, and/or display syncing wait time on the client device.

In some instances, the AR/VR scene may include one or more elements. In such instances, receiving data associated with the content application may include receiving one or more streams of data. Note that each stream of data may be associated with a respective element of the one or more elements. The one or more elements may include at least one of a menu user interface (UI) element, an interactive 3D model, a static 3D model, a background 3D model, and/or a background image. Additionally, each element of the one or more elements may be encoded separately according to a respective frame rate for the element and/or resolution properties associated with the element. In some instances, the client device may cache a particular stream of data of the one or more streams of data over multiple frames. In some instances, the client device may resample a particular stream of data of the one or more streams of data. In some instances, the client device may composite a full-resolution image or a full-frame rate image.

In some instances, the client device may incorporate attributes with semantic hints as input options into a spatiotemporal filter or an artificial intelligence (AI) image enhancement algorithm. Additionally, the AI image enhancement algorithm may be optimized for different object types within the AR/VR scene, and may use a recent history of images received to both enhance image clarity and/or increase effective frame rate. Further, the different object types within the AR/VR scene include one or more of text, two-dimensional (2D) images, and/or three-dimensional (3D) images.

In some instances, a quality of service (QoS) attribute may be assigned for each channel of communication between the client device and server. The QoS attributes may be assigned based, at least in part, on user preferences, directives provided by the server, or directives provided by the content application. Additionally, the channels of communication between the client device and server may include one or more of data channels for head and/or eye tracking state upload, stylus and/or hand tracking state upload, mouse and/or keyboard state upload, final frame video download, or download of individual layers.

In some instances, in response determining that transmissions from the server to client device are occurring at a low-frame rate, the client device may reproject the AR/VR scene utilizing structure from stereo information and/or depth information about a last complete image and/or set of images received from the server. In some instances, the AR/VR scene may be reprojected according to locally occurring head tracking data. The locally occurring head tracking data may not have been received from the server. Additionally, the AR/VR scene may be reprojected into a new perspective according to the locally occurring head tracking data. In some instances, the AR/VR scene may be reprojected using knowledge of a current projection used to render a last frame. In some instances, gaps occurring in the reprojected AR/VR scene may be filled in using neighboring pixels.

Figure 15:
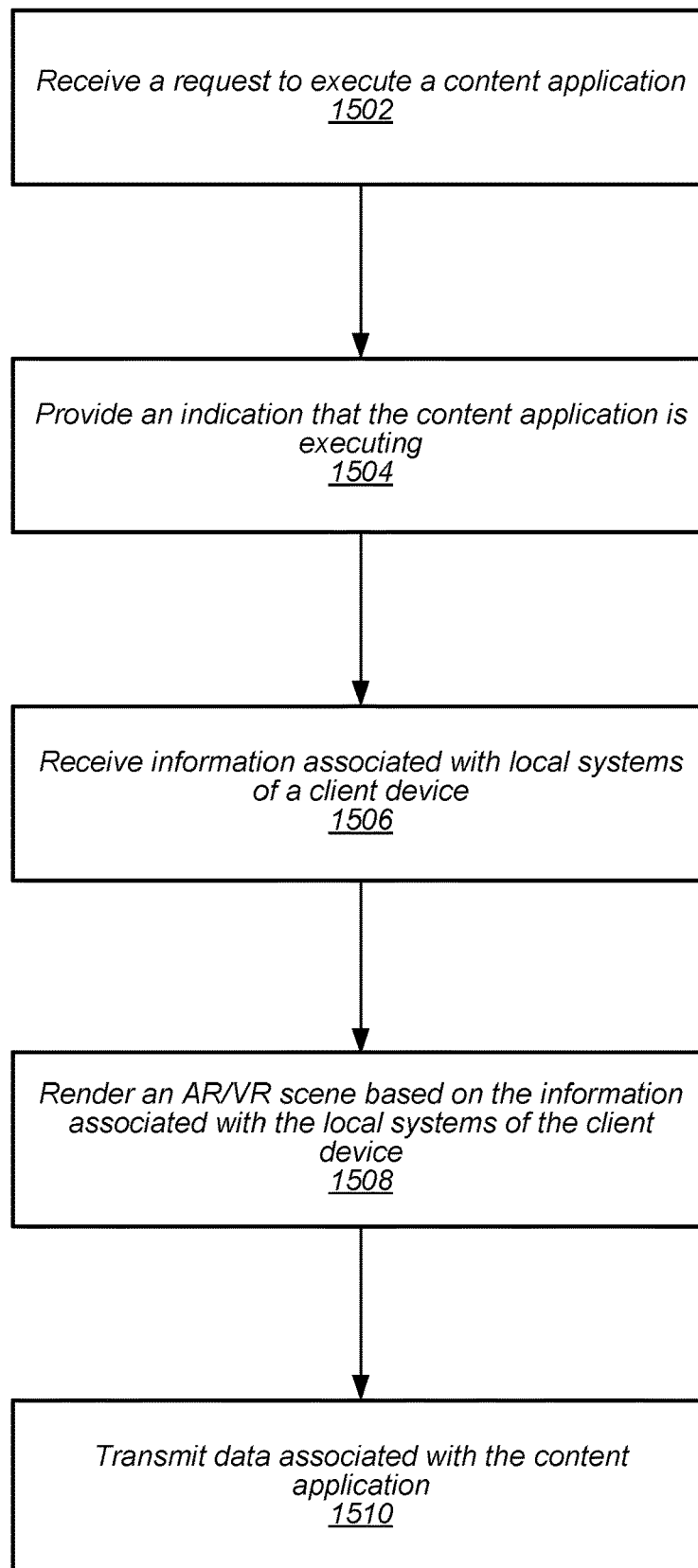
FIG. 15 illustrates a block diagram of another example of a method for cloud rendering an augmented and/or virtual reality (AR/VR) scene, according to some embodiments.

FIG. 15 illustrates a block diagram of another example of a method for cloud rendering an augmented and/or virtual reality (AR/VR) scene, according to some embodiments. The method shown in FIG. 15 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1502, a server, such as remote device 1104 and/or 1304 (and/or more generally, server 104), may receive a request to execute a content application from a client device, such as AR/VR device 1106 and/or 1306 (and/or more generally, client station 106). The content application may render a three-dimensional (3D) scene for display on one or more displays of the client device. The 3D scene may be considered an AR scene and/or a VR scene. For example, the server may receive information associated with the content application from the client device via a network, e.g., via a wired and/or wireless network connection. As an example, the client device may be attached to a base station, such as base station 102 and may communicate with the server via a 3GPP protocol, such as LTE or 5G NR. In some instances, the client device may be attached to a 5G core network via both cellular and non-cellular connections; thus, the communications with the server may be via both cellular and non-cellular communications. As another example, the client device may be attached to an access point, such as access point 112 and may communication with the server via a Wi-Fi protocol. In some instances, the client device may use a combination of access types (e.g., both a Wi-Fi protocol and a 3GPP protocol) to communicate with the server. Note that the sever may be a part of a core network and/or may be outside of the core network.

In some instances, the information associated with the content application, may be information associated with the client device. For example, the information may include any, any combination of, and/or all of (e.g., one or more of and/or at least one of) a display size of a display of the client device, a display resolution of the display of the client device, a display model of the display of the client device, system specifications of the client device, a system language of the client device, and/or a system locale of the client device.

At 1504, the server may provide an indication, to the client device, that the content application is executing.

At 1506, the server may receive, from the client device may provide via the network, information associated with local systems and/or sub-systems of the client device. In some instances, receiving information associated with the local systems may include receiving encoded local tracking system state information from the client device via the network. Additionally, in some instances, receiving information associated with the local systems may include receiving encoded user input events and user input state information from the client device via the network. In some instances, the local tracking system state information may include any, any combination of, and/or all of (e.g., one or more and/or at least one of) head tracking state, eye tracking state, user tracking state, head tracking quality, eye tracking quality, user tracking quality, head tracking poses, user tracking poses, and/or eye tracking poses. In some instances, the user input events may include keyboard events and/or mouse events.

At 1508, the server may render an AR/VR scene based on the information associated with the local systems of the client device.

At 1510, the server may transmit, to the client device via the network, data associated with the content application. The data may be based on the information associated with the local systems. In some instances, the data may include a left eye image and a right eye image. In some instances, the data may include images for rendering a 3D scene according to any of various image formatting techniques for display of a 3D scene. In some instances, the date may include an encoded image or video frame.

In some instances, the server may continuously receive information associated with the local systems and transmit data associated with the content application. In other words, the server may periodically perform receiving information associated with the local systems and transmitting data associated with the content application. In some instances, the server may continuously receive information associated with the local systems and transmit data associated with the content application until a notification indicating that the content application has been closed is received from the content application. In some instances, a rate (e.g., periodicity) at which the server continuously receives information associated with the local systems and transmits data associated with the content application may be at least two times per second. In some instances, the rate may be associated with and/or correspond to a display rate of the AR/VR scene, e.g., 30 Hertz (Hz), 60 Hz, 120 Hz, 240 Hz, and so forth. For example, when the AR/VR scene is displayed at 30 Hz (e.g., a frame update rate of 30 times per second), the server may receive information associated with the local systems and transit data associated with the content application 30 times per second. Similarly, when the AR/VR scene is displayed at 60 Hz and/or 120 Hz (e.g., a frame update rate of 60 and/or 120 times per second), the server may provide information associated with the local systems and transmit data associated with the content application 60 and/or 120 times per second. The server may dynamically determine the video frame rate according to quality (bandwidth and/or latency) of the client device's connection to the server, preferences received by the client device, preferences received by the server environment and/or cloud environment, and/or a number of client devices (e.g., a number of content applications) concurrently connected to the server. In some instances, the rate (e.g., periodicity) of receiving information associated with the local systems and transmitting data associated with the content application may be based, at least in part, on a throughput rate of the network connection between the client device and the server.

In some instances, the server may provide, to the client device, an indication that the content application supports local rendering of a virtual beam from an input device. In other words, the content application may support allowing the client device to locally render the virtual beam based on data received from the content application, e.g., to avoid and/or overcome latency issues associated with display of the virtual beam. In addition, the server may receive, from the client device, an indication that the client device intends to render the virtual beam. Further, the server may transmit, to the client device, data associated with rendering of the virtual beam. The data associated with rendering of the virtual beam may include three-dimensional (3D) visualization information. For example, the 3D visualization information may include any, any combination of, and/or all of (e.g., one or more of and/or at least one of) mesh data associated with the virtual beam, textures associated with the virtual beam, and/or materials associated with the virtual beam. Additionally, the server may transmit, to the client device, a depth map capture of the AR/VR scene, e.g., generated by the content application. The server may encode the depth map capture of the AR/VR scene For example, if an initial time, T0, is the point in time a tracked input physically moved at the client device, (e.g., user's head moves), a first time, T1, may be a time the tracked input may be detected by the client device and new pose coordinates computed locally. Further, a second time, T2, may be a time the new pose coordinates have been used to render a new image on the server (including network upload time) and a third time, T3, maybe a time the new image has been received by the client. Thus, a fourth time, T4, may be a time the new image has been downloaded by the client device, decoded, recomposited (if needed), reprojected (if needed), interweaved (if needed) and presented on the physical display, such that T0<T1<T2<T3<T4. Thus, a purpose the holistic predictive tracking algorithm is to predict at T2 a most optimal (e.g., accurate) prediction for tracking data that would most likely exist at T4. Thus, part or all of the holistic predictive tracking algorithm may execute on the server. In some embodiments, the holistic predictive tracking algorithm may take in into consideration all known or recently estimated latencies and standard deviations for each stage (e.g., T0 to T1, T1 to T2, T2 to T3, and so forth) in order to produce an optimal predicted tracking pose at time T2 for T4 presentation to a user of the client device. For example, these actual or estimated component latencies may be associated with photon capture time in the sensors, tracking processing time in the client processor, network transmission time uploading pose data, rendering time on the server, network transmission time downloading the new image data, decoding time on the client device, and/or display syncing wait time on the client device.

In some instances, the AR/VR scene may include one or more elements. In such instances, transmitting data associated with the content application may include transmitting one or more streams of data. Note that each stream of data may be associated with a respective element of the one or more elements. The one or more elements may include at least one of a menu user interface (UI) element, an interactive 3D model, a static 3D model, a background 3D model, and/or a background image. Additionally, each element of the one or more elements may be encoded separately according to a respective frame rate for the element and/or resolution properties associated with the element.

In some instances, a quality of service (QoS) attribute may be assigned for each channel of communication between the client device and server. The QoS attributes may be assigned based, at least in part, on user preferences, directives provided by the server, or directives provided by the content application. Additionally, the channels of communication between the client device and server may include one or more of data channels for head and/or eye tracking state upload, stylus and/or hand tracking state upload, mouse and/or keyboard state upload, final frame video download, or download of individual layers.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer readable memory medium storing programming instructions executable by processing circuitry of a client device comprising a three-dimensional (3D) display to:

receive, from a server executing a content application, data based on the content application, wherein the data is received over a network, and wherein the data is based on information the client device provided to the server;

render a 3D scene based on the received data; and incorporate attributes with semantic hints as input options into an artificial intelligence (AI) image enhancement algorithm, wherein the AI image enhancement algorithm is optimized for different object types within the 3D scene, and wherein the different object types within the 3D scene include one or more of text, two-dimensional (2D) images, or 3D images.

2. The non-transitory computer readable memory medium of claim 1,
wherein the information includes first information that is associated with the client device, and wherein the first information includes one or more of a display size, a display resolution, a display model, system specifications, a system language, or a system locale.

3. The non-transitory computer readable memory medium of claim 1,
wherein the programming instructions are further executable by the processing circuitry of the client device to:
create a local stereoscopic-enabled window or full-screen surface; and
initialize tracking sub-systems.

4. The non-transitory computer readable memory medium of claim 1,
wherein the client device includes one or more of a head tracking sub-system, an eye tracking sub-system, or a user tracking sub-system, and wherein user tracking includes at least one of user hand tracking or stylus tracking.

5. The non-transitory computer readable memory medium of claim 1,
wherein the information includes information associated with local systems, and wherein to provide the information associated with the local systems to the server, the programming instructions are further executable by the processing circuitry of the client device to:
receive local tracking system state information;
encode the local tracking system state information;
transmit the local tracking system state information to the server via the network;
encode user input events and user input state information; and
transmit the user input events and user input state information to the server via the network.

6. The non-transitory computer readable memory medium of claim 5,
wherein the local tracking system state information includes one or more of:
head tracking state, quality, and poses;
eye tracking state, quality, and poses; or
user tracking state, quality, and poses.

7. The non-transitory computer readable memory medium of claim 5,
wherein the user input events include one or more of keyboard events or mouse events.

8. The non-transitory computer readable memory medium of claim 1,
wherein the AI image enhancement algorithm receives a recent history of images and enhances image clarity based on the recent history of images.

9. A three-dimensional (3D) display system comprising:
at least one radio, wherein the at least one radio is configured to perform wireless communication using at least one radio access technology (RAT);
at least one processor coupled to the at least one radio, wherein the one or more processors and the at least one radio are configured to perform data communications;
one or more displays, coupled to the at least one processor;
a tracking system comprising two or more cameras and in communication with the at least one processor; and
a memory in communication with the tracking system and the at least one processor, wherein the at least one processor is configured to:
receive, from a server executing a content application, data based on the content application, wherein the data is received over a network, and wherein the data is based on information the 3D display system provided to the server;
render a 3D scene based on the received data; and
incorporate attributes with semantic hints as input options into an artificial intelligence (AI) image enhancement algorithm, wherein the AI image enhancement algorithm is optimized for different object types within the 3D scene, and wherein the different object types within the 3D scene include one or more of text, two-dimensional (2D) images, or 3D images.

10. The 3D display system of claim 9,
wherein the at least one processor is further configured to:
predict a movement of a user based on physiological assumptions regarding a target audience of users and one or more network factors, and wherein the one or more network factors include at least one of:
measured network reliability according to a trailing window;
a geographic location of an edge of a cell relative to a current location of the 3D display system; or
a geographic location of a content delivery network cloud facility hosting the server relative to the current location of the 3D display system.

11. The 3D display system of claim 9,
wherein the 3D scene includes one or more elements, and wherein, to receive data associated with the content application, the at least one processor is further configured to receive one or more streams of data, wherein each stream of data is associated with a respective element of the one or more elements.

12. The 3D display system of claim 11,
wherein the one or more elements include at least one of a menu user interface (UI) element, an interactive 3D model, a static 3D model, a background 3D model, or a background image.

13. The 3D display system of claim 11,
wherein each element of the one or more elements is encoded separately according to at least one of a respective frame rate for the element or resolution properties associated with the element.

14. A method for rendering a three-dimension (3D) scene, comprising:
a client device,
receiving, from a server executing a content application, data based on the content application, wherein the data is received over a network, and wherein the data is based on information the client device provided to the server;

rendering a 3D scene based on the received data; and
incorporating attributes with semantic hints as input options into an artificial intelligence (AI) image enhancement algorithm, wherein the AI image enhancement algorithm is optimized for different object types within the 3D scene, and wherein the different object types within the 3D scene include one or more of text, two-dimensional (2D) images, or 3D images.

15. The method of claim 14,
wherein the information includes one or more of a display size of a display of the client device, a display resolution of a display of the client device, a display model of a display of the client device, system specifications of the client device, a system language of the client device, or a system locale of the client device.

16. The method of claim 14,
wherein the information includes local tracking system state information, and wherein the local tracking system state information includes one or more of:
head tracking state, quality, and poses;
eye tracking state, quality, and poses; or
user tracking state, quality, and poses.

17. The method of claim 14,
wherein quality of service (QoS) attributes are assigned for each channel of communication between the client device and server.

18. The method of claim 17,
wherein the QoS attributes are assigned based, at least in part, on user preferences, directives provided by the server, or directives provided by the content application.

19. The method of claim 17,
wherein the channels of communication between the client device and server include one or more of data channels for head and/or eye tracking state upload, stylus and/or hand tracking state upload, mouse and/or keyboard state upload, final frame video download, or download of individual layers.

20. The method of claim 14,
wherein the network operates according to Third Generation Partnership Project (3GPP) Fifth Generation (5G) New Radio (NR); and
wherein the client device comprises a user equipment device (UE).

* * * * *